(12) United States Patent
Grobelny et al.

(10) Patent No.: US 12,223,029 B2
(45) Date of Patent: Feb. 11, 2025

(54) SYSTEMS AND METHODS FOR TRANSFER OF WORKSPACE ORCHESTRATION

(71) Applicant: Dell Products, L.P., Round Rock, TX (US)

(72) Inventors: Nicholas D. Grobelny, Evergreen, CO (US); Charles D. Robison, Buford, GA (US)

(73) Assignee: Dell Products, L.P., Round Rock, TX (US)

( * ) Notice: Subject to any disclaimer, the term of this patent is extended or adjusted under 35 U.S.C. 154(b) by 537 days.

(21) Appl. No.: 17/647,796

(22) Filed: Jan. 12, 2022

(65) Prior Publication Data

US 2023/0222200 A1    Jul. 13, 2023

(51) Int. Cl.
*G06F 21/31*    (2013.01)
*G06F 21/34*    (2013.01)
(Continued)

(52) U.S. Cl.
CPC .............. *G06F 21/44* (2013.01); *G06F 21/34* (2013.01); *G06F 21/606* (2013.01); *G06F 2221/2153* (2013.01)

(58) Field of Classification Search
CPC . H04L 63/1433; H04L 63/20; H04L 63/1441; H04L 63/102; H04L 63/08; H04L 63/10; H04L 2209/38; H04L 63/1416; H04L 2209/46; H04L 2209/805; H04L 41/046; H04L 41/0893; H04L 41/12; H04L 41/145; H04L 41/16; H04L 63/0853; H04L 63/104; H04L 63/1425; H04L 63/205; H04L 63/0272; H04L 61/1511; H04L 63/0236; H04L 67/563; G06F 2221/2101; G06F 21/552; G06F 21/554; G06F 21/56; G06F 21/566; G06F 2221/034;
(Continued)

(56) References Cited

U.S. PATENT DOCUMENTS

| 6,914,905 B1* | 7/2005 | Yip | H04L 45/00 370/395.53 |
| 7,664,879 B2* | 2/2010 | Chan | H04L 67/14 711/113 |

(Continued)

*Primary Examiner* — Sharif E Ullah
(74) *Attorney, Agent, or Firm* — Fogarty LLP

(57) ABSTRACT

Systems and methods support transferring control of a workspace that operates on an Information Handling System (IHS). An authorization policy is established on the IHS that is modifiable only by an arbiter of a remote orchestration service. The authorization policy specifies authorized administrators of the workspace. The authorization policy is modified to specify the arbiter and a first remote orchestrator as authorized administrators of the workspace. Administration of the workspace by the first orchestrator is allowed based on credentials that validate it as an authorized administrator specified by the policy. A notification is received of a transfer of orchestration of the workspace to a second remote orchestrator. The authorization policy is modified to specify the arbiter and the second orchestrator as authorized administrators of the workspace. Administration of the workspace by the second orchestrator is allowed based on credentials that validate it as an authorized administrator specified by the policy.

20 Claims, 7 Drawing Sheets

(51) Int. Cl.
  *G06F 21/44* (2013.01)
  *G06F 21/60* (2013.01)
(58) Field of Classification Search
  CPC ...... G06F 21/57; G06F 21/577; G06F 21/602;
    G06F 21/6209; G06F 21/6218; G06F
    8/61; G06F 21/44; H04W 12/06; H04W
    12/08; H04W 12/0027; H04W 12/00505;
    H04W 12/0609
  USPC ............ 726/1, 2, 21, 36; 713/150, 163, 181;
    380/255, 264, 276
  See application file for complete search history.

(56) References Cited

U.S. PATENT DOCUMENTS

| | | | | |
|---|---|---|---|---|
| 7,725,934 | B2 * | 5/2010 | Kumar | H04L 63/0245 |
| | | | | 713/188 |
| 7,962,582 | B2 * | 6/2011 | Potti | H04L 63/102 |
| | | | | 370/400 |
| 8,010,085 | B2 * | 8/2011 | Apte | G06F 21/577 |
| | | | | 709/227 |
| 8,245,141 | B1 * | 8/2012 | Fuller | H04L 63/104 |
| | | | | 715/741 |
| 8,453,159 | B2 * | 5/2013 | Appelbaum | G06F 16/24565 |
| | | | | 709/229 |
| 8,464,335 | B1 * | 6/2013 | Sinha | G06F 21/51 |
| | | | | 713/153 |
| 8,656,154 | B1 * | 2/2014 | Kailash | H04L 63/0807 |
| | | | | 713/168 |
| 8,769,268 | B2 * | 7/2014 | Morozov | G06F 21/74 |
| | | | | 718/107 |
| 8,868,757 | B1 * | 10/2014 | Liu | H04L 67/563 |
| | | | | 709/227 |
| 8,869,259 | B1 * | 10/2014 | Udupa | H04L 63/20 |
| | | | | 726/10 |
| 8,869,262 | B2 * | 10/2014 | Mullick | H04L 63/0876 |
| | | | | 709/227 |
| 8,955,091 | B2 * | 2/2015 | Kailash | H04L 63/1425 |
| | | | | 726/11 |
| 9,065,800 | B2 * | 6/2015 | Devarajan | G06F 21/56 |
| 9,100,424 | B1 * | 8/2015 | Thomas | H04L 69/16 |
| 9,124,586 | B2 * | 9/2015 | Randriamasy | H04L 67/101 |
| 9,344,393 | B2 * | 5/2016 | Boynton | H04L 63/0428 |
| 9,497,220 | B2 * | 11/2016 | Cardamore | H04W 12/084 |
| 9,531,758 | B2 * | 12/2016 | Devarajan | H04L 63/20 |
| 9,654,507 | B2 * | 5/2017 | Gangadharappa | H04L 63/20 |
| 9,712,486 | B2 * | 7/2017 | Johnson | H04W 12/35 |
| 9,882,767 | B1 * | 1/2018 | Foxhoven | H04L 61/4552 |
| 9,935,955 | B2 * | 4/2018 | Desai | H04L 67/02 |
| 10,044,719 | B2 * | 8/2018 | Desai | H04L 63/20 |
| 10,091,169 | B2 * | 10/2018 | Cohen | H04L 67/10 |
| 10,142,362 | B2 * | 11/2018 | Weith | H04L 63/20 |
| 10,313,397 | B2 * | 6/2019 | Komu | H04L 63/20 |
| 10,333,988 | B2 * | 6/2019 | Porras | H04L 63/107 |
| 10,637,724 | B2 * | 4/2020 | Johnson | H04L 41/0803 |
| 11,316,902 | B2 * | 4/2022 | Andrews | H04L 63/20 |
| 11,720,700 | B2 * | 8/2023 | Kozlowski | G06F 21/44 |
| 2002/0091921 | A1 * | 7/2002 | Kunzinger | H04L 63/0471 |
| | | | | 713/153 |
| 2003/0028616 | A1 * | 2/2003 | Aoki | H04L 67/1001 |
| | | | | 709/217 |
| 2005/0088977 | A1 * | 4/2005 | Roch | H04L 47/31 |
| | | | | 370/254 |
| 2006/0069656 | A1 * | 3/2006 | Horikiri | H04N 7/15 |
| | | | | 348/E7.083 |
| 2012/0255036 | A1 * | 10/2012 | Kidder | H04L 63/08 |
| | | | | 726/29 |
| 2014/0026206 | A1 * | 1/2014 | Pazhyannur | H04W 12/06 |
| | | | | 726/12 |
| 2014/0259093 | A1 * | 9/2014 | Narayanaswamy | H04L 47/20 |
| | | | | 726/1 |
| 2017/0054594 | A1 * | 2/2017 | Decenzo | H04L 69/18 |
| 2018/0309795 | A1 * | 10/2018 | Ithal | H04L 63/029 |
| 2018/0316723 | A1 * | 11/2018 | Murgia | H04L 63/0428 |
| 2018/0359323 | A1 * | 12/2018 | Madden | H04L 12/4633 |
| 2020/0067984 | A1 * | 2/2020 | Fausak | H04L 63/08 |
| 2020/0322357 | A1 * | 10/2020 | Bryan | H04L 63/1408 |

* cited by examiner

SYSTEMS AND METHODS FOR TRANSFER OF WORKSPACE ORCHESTRATION

FIELD

This disclosure relates generally to Information Handling Systems (IHSs), and, more specifically, to administration of workspaces operating on IHSs.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

In various embodiments, methods provide transferring of control of workspaces on an Information Handling System (IHS). The methods may include: establishing, on the IHS, an authorization policy that is only modifiable based on information provided by an arbiter of a remote workspace orchestration service, wherein the authorization policy specifies authorized administrators of a workspace operating on the IHS; modifying the authorization policy to specify the arbiter and a first remote orchestrator as authorized administrators of the workspace; allowing administration of the workspace by the first remote orchestrator based on credentials provided by the first remote orchestrator that validate it as one of the authorized administrators specified by the authorization policy; receiving notification of a transfer of orchestration of the workspace to a second remote orchestrator; modifying the authorization policy to specify the arbiter and the second remote orchestrator as authorized administrators of the workspace; and allowing administration of the workspace by the second remote orchestrator based on credentials provided by the second remote orchestrator that validate it as one of the authorized administrators specified by the authorization policy.

In additional method embodiments, the authorization policy is implemented by a TPM (Trusted Platform Module) of the IHS. In additional method embodiments, the TPM validates the credentials provided by the first remote orchestrator and the credentials provided by the second remote orchestrator. In additional method embodiments, the modification of the authorization policy that specifies the first remote orchestrator as an authorized administrator provides authorization policy credentials for validating the first remote orchestrator, and wherein the modification of the authorization policy that specifies the second remote orchestrator as an authorized administrator provides authorization policy credentials for validating the second remote orchestrator. In additional method embodiments, the credentials provided by the first remote orchestrator and the credentials provided by the second remote orchestrator are validated by the TPM against the authorization policy credentials provided by the arbiter. In additional method embodiments, methods may further include modifying, by the arbiter, the authorization policy to remove second remote orchestrator as an authorized administrator of the workspace. In additional method embodiments, the workspace is deployed on the IHS based on a workspace definition that specifies the first remote orchestrator as an authorized administrator of the workspace. In additional method embodiments, the modification of the authorization policy to specify the arbiter and the second remote orchestrator as authorized administrators of the workspace further comprises modification of the workspace definition to remove the first remote orchestrator and to add the second remote orchestrator as authorized administrators of the workspace. In additional method embodiments, the transfer of orchestration of the workspace to the second remote orchestrator comprises a temporary transfer allowing the second remote orchestrator to perform a plurality of service actions on the workspace. In additional method embodiments, the method may further include, once the service by the second remote orchestrator is complete, modifying the authorization policy to specify the arbiter and the first remote orchestrator as authorized administrators of the workspace.

In various additional embodiments, Information Handling Systems (IHSs) may include: a processor; a memory coupled to the processor, the memory having program instructions stored thereon that, upon execution, cause the processor to operate a workspace on the IHS; and a TPM (Trusted Platform Module) having program instructions stored thereon that, upon execution, cause the TPM to: establish an authorization policy that is only modifiable based on information provided by an arbiter of a remote workspace orchestration service, wherein the authorization policy specifies authorized administrators of the workspace; modify the authorization policy to specify the arbiter and a first remote orchestrator as authorized administrators of the workspace; allow administration of the workspace by the first remote orchestrator based on credentials provided by the first remote orchestrator that validate it as one of the authorized administrators specified by the authorization policy; receive notification of a transfer of orchestration of the workspace to a second remote orchestrator; modify the authorization policy to specify the arbiter and the second remote orchestrator as authorized administrators of the workspace; and allow administration of the workspace by the second remote orchestrator based on credentials provided by the second remote orchestrator that validate it as one of the authorized administrators specified by the authorization policy.

In additional IHS embodiments, the TPM validates the credentials provided by the first remote orchestrator and the credentials provided by the second remote orchestrator. In additional IHS embodiments, the workspace is deployed on the IHS based on a workspace definition that specifies the first remote orchestrator as an authorized administrator of the workspace. In additional IHS embodiments, the modification of the authorization policy to specify the arbiter and the second remote orchestrator as authorized administrators of the workspace further comprises modification of the workspace definition to remove the first remote orchestrator and to add the second remote orchestrator as authorized administrators of the workspace. In additional IHS embodiments, the transfer of orchestration of the workspace to the second remote orchestrator comprises a temporary transfer allowing the second remote orchestrator to perform a plurality of service actions on the workspace. In additional IHS embodiments, once the service by the second remote orchestrator is complete, the authorization policy is modified to specify the arbiter and the first remote orchestrator as authorized administrators of the workspace.

In various additional embodiments, systems may include an IHS (Information Handling System) including: a processor; and a memory coupled to the processor, the memory having program instructions stored thereon that, upon execution, cause the processor to operate a workspace on the IHS. The systems may also include a workspace orchestration service that supports workspaces operating on the IHS (Information Handling System), wherein the workspace orchestration service comprises: a first remote orchestrator; a second remote orchestrator; and an arbiter configured to: establish an authorization policy on the IHS that is only modifiable based on information provided by the arbiter, wherein the authorization policy specifies authorized administrators of the workspace; modify the authorization policy to specify the arbiter and the first remote orchestrator as authorized administrators of the workspace, wherein based on the modification of the authorization policy, administration of the workspace by the first remote orchestrator is allowed, wherein the first remote orchestrator provides credentials that validate it as one of the authorized administrators specified by the authorization policy; receive notification of a transfer of orchestration of the workspace to a second remote orchestrator; and modify the authorization policy to specify the arbiter and the second remote orchestrator as authorized administrators of the workspace, wherein based on the modification of the authorization policy, administration of the workspace by the second remote orchestrator is allowed, wherein the second remote orchestrator provides credentials that validate it as one of the authorized administrators specified by the authorization policy.

In additional system embodiments, the authorization policy is implemented by a TPM (Trusted Platform Module) of the IHS. In additional system embodiments, the TPM validates the credentials provided by the first remote orchestrator and the credentials provided by the second remote orchestrator. In additional system embodiments, the modification of the authorization policy that specifies the first remote orchestrator as an authorized administrator provides authorization policy credentials for validating the first remote orchestrator, and wherein the modification of the authorization policy that specifies the second remote orchestrator as an authorized administrator provides authorization policy credentials for validating the second remote orchestrator.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
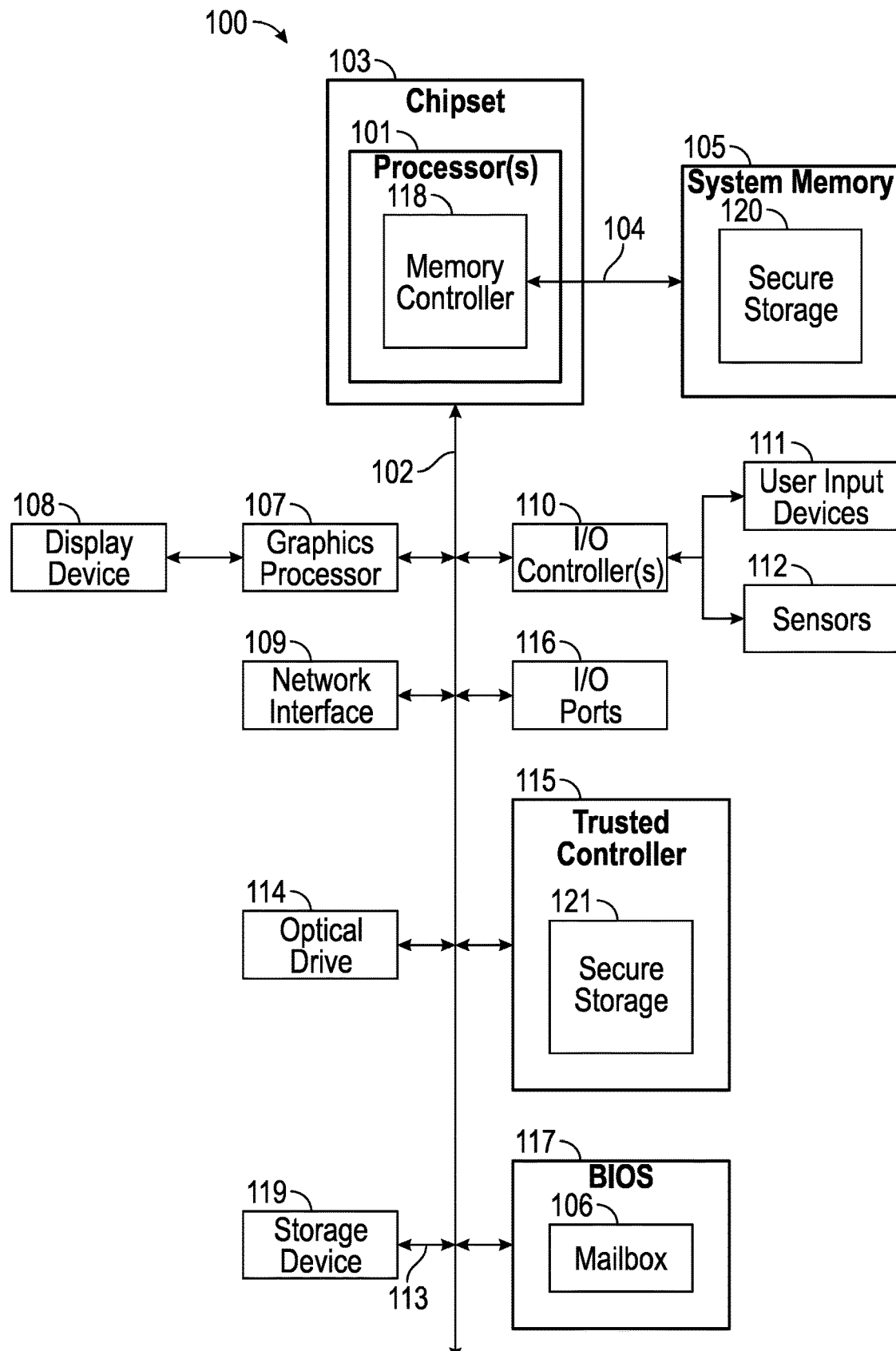
FIG. 1 is a diagram depicting illustrative components of an Information Handling System (IHS) configured, according to various embodiments, to transfer control of remote orchestration of a workspace operating on the IHS.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, such as laptop computers, other embodiments may utilize various other types of IHSs, such as rack-mounted servers used in remote orchestration of workspaces.

FIG. 1 is a diagram depicting illustrative components of an Information Handling System (IHS) configured, according to various embodiments, to transfer control of remote orchestration of a workspace operating on the IHS. In some embodiments, IHS 100 may be employed to instantiate, manage, and/or terminate a workspace, such as a secure environment that may provide the user of IHS 100 with access to enterprise data while isolating the enterprise data from an Operating System (OS) and/or other applications executed by IHS 100. Workspaces may operate on an IHS 100 in various different configurations and may be dynamically assembled such that the computing architecture that is selected for the workspace is based on the observed security and productivity contexts in which the workspace will operate. As described in additional detail below, workspaces are configured for operation on an IHS 100 based on operations of a remote workspace orchestration service that may be formed from a layer of servers or other IHSs. A remote orchestrator of this service determines an appropriate workspace for providing access to a protected resource on an IHS 100 and for deploying the workspace on the IHS 100. As described in additional detail below, throughout the operation of the workspace on the IHS, the remote orchestration service provides ongoing support of the workspace on the IHS, including ensuring the IHS 100 continues to provide adequate protection and adequate productivity, as the context in which the IHS 100 operates changes throughout the ongoing use of the IHS. As a workspace is adapted in response to context changes, various circumstances may also require a change in control of remote orchestration in order to support ongoing operation of a workspace on IHS 100. Embodiments provide capabilities to transfer control of remote orchestration of a workspace operating on IHS 100, where the transfer may be between trusted remote orchestration entities operating within the remote workspace orchestration service.

As shown in FIG. 1, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing functions. Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs, or any other suitable ISA. In the embodiment of FIG. 1, processor(s) 101 includes an integrated memory controller 118 that may be implemented directly within the circuitry of processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 that is coupled to processor(s) 101 via memory bus 104 provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory.

In certain embodiments, system memory 105 includes secure storage 120 that may be a portion of the system memory designated for storage of information, such as access policies, component signatures, encryption keys, and other cryptographic information, for use in hosting a secure workspace on IHS 100. In such embodiments, a signature may be calculated based on the contents of secure storage 120 and stored as a reference signature. The integrity of the data stored in secure storage 120 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, processor(s) 101 is depicted as a component of chipset 103. In other embodiments, all of chipset 103, or portions of chipset 108 may be implemented directly within the integrated circuitry of processor(s) 101. Chipset 103 provides processor(s) 101 with access to a variety of resources accessible via bus 102. In IHS 100, bus 102 is illustrated as a single element. However, other implementations may utilize any number of buses to provide the illustrated pathways served by bus 102.

As illustrated, a variety of resources may be coupled to processor(s) 101 of IHS 100 through chipset 103. For instance, chipset 103 may be coupled to network interface 109, such as provided by a Network Interface Controller (NIC) that is coupled to IHS 100 and allows IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. In certain embodiments, network interface 109 may support connections between a trusted IHS component, such as trusted controller 115, and a remote orchestration service. In such embodiments, a connection supported by network interface 109 between the remote orchestration service and the trusted component may be considered an out-of-band (OOB) connection that is isolated from the OS of the IHS.

Chipset 102 may also provide access to one or more display device(s) 108 via graphics processor 107. In certain embodiments, graphics processor 107 may be comprised within one or more video or graphics cards or an embedded controller installed as components of IHS 100. Graphics processor 107 may generate display information and provide the generated information to one or more display device(s) 108 coupled to IHS 100, where display device(s) 108 may include integrated display devices and/or external display devices coupled to IHS, such as via an I/O port 116, where display device(s) 108 may include integrated display devices and/or external display devices coupled to IHS. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102.

In certain embodiments, chipset 103 may utilize one or more I/O controllers 110 to access hardware components such as user input devices 111 and sensors 112. For instance, I/O controller 110 may provide access to user-input devices 111 such as a keyboard, mouse, touchpad, touchscreen and/or other peripheral input devices. User input devices 111 may interface with I/O controller 110 through wired or wireless connections. Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, sensors, IR sensors, photosensors, proximity sensors, distance sensors, magnetic sensors, microphones, ultrasonic sensors, etc.).

In some cases, chipset 103 may include a sensor hub capable of utilizing information collected by sensors 112 in determining the relative orientation and movement of IHS 100. For instance, the sensor hub may utilize inertial movement sensors, that may include accelerometer, gyroscope, and magnetometer sensors, and are capable of determining the orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, the sensor hub may also include capabilities for determining a location and movement of IHS 100 based on triangulation of network signal and based on network information provided by the OS or network interface 109. In some embodiments, the sensor hub may support additional sensors, such as optical, infrared and sonar sensors, that may provide support for xR (virtual, augmented, and/or mixed reality) sessions hosted by the IHS 100 and may be used by the sensor hub provide an indication of a user's presence near IHS 100, such as whether a user is present, absent, and/or facing integrated display 108.

In cases where the end-user is present before IHS 100, the sensor hub may further determine a distance of the end-user from the IHS, where this determination may be made continuously, at periodic intervals, or upon request. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B). As described in additional detail below, the failure to detect an authenticated user of IHS 100 within a proximity of IHS 100 may result in a change in the security profile of IHS 100, thus triggering a re-evaluation of the security risk of workspaces operating on IHS 100. Similar re-evaluation may be triggered based on the detection of additional individuals in proximity to IHS 100.

In embodiments where IHS 100 may support multiple physical configurations, such as a convertible laptop, N-in-1 device, or the like, the sensor hub may utilize one or more mode sensors 112 that collect readings that may be used in determining the posture in which IHS 100 is physically configured. In certain embodiments, such posture determinations may be additionally made using the movement and orientation information provided by sensors 112. In laptop and convertible laptop embodiments, for example, processor 101 or trusted controller 115 may utilize a lid position sensor 112 to determine the relative angle between the two panels of the laptop in order to determine the mode in which IHS 100 is physically configured. In such embodiments, the lid position sensor may measure the angle of rotation of the hinge that connects the base panel and lid panel of IHS 100. In some embodiments, processor 101 or trusted controller 115 may provide collected lid position information, such as the hinge angle, to the sensor hub for use in determining the posture in which IHS 100 is configured. In some embodiments, the sensor hub may interface directly with the lid position sensor in determining hinge angle information.

The sensor hub may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. The sensor hub may additionally utilize orientation and movement information collected from inertial movement sensors 112 to further determine the posture in which IHS 100 is physically configured. For instance, if the sensor hub determines that IHS 100 is configured with a hinge angle of a laptop configuration, but IHS 100 is oriented on its side, the IHS may be determined to be in a book mode. If IHS 100 is determined to be tilted such that the hinge is oriented between horizontal and vertical, the user's face is detected to be facing the integrated display, and IHS 100 is experiencing slight movement, the sensor hub may determine that IHS 100 is being used in a book posture. The sensor hub may determine that IHS 100 is opened to a 180-degree hinge angle and lies on a flat surface, thus indicating that IHS 100 it is being used in a landscape posture. The sensor hub may similarly determine that IHS 100 is in a tent configuration, in response to detecting a hinge angle within a defined range, such as between 300 and 345 degrees, and also detecting an orientation of IHS 100 where the hinge is aligned horizontally and is higher than both of the display panels of IHS 100.

Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100. In some embodiments, external devices coupled to IHS 100 via an I/O port 116 may include storage devices that support transfer of data to and from system memory 105 and/or storage devices 119 of IHS 100. As described in additional detail below, the coupling of storage devices via an I/O port 116 may result in a change in the security profile of IHS 100, thus triggering a re-evaluation of the security risk of workspaces operating on IHS 100.

Chipset 103 also provides processor(s) 101 with access to one or more storage devices 119. In various embodiments, storage device 119 may be integral to IHS 100, or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In some embodiments, storage device 119 may be a system of storage devices, such as a cloud drive accessible via network interface 109.

As illustrated, IHS 100 also includes BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to IHS 100. BIOS 117 instructions may also load an OS for use by IHS 100. BIOS 117 provides an abstraction layer that allows the OS to interface with the hardware components of IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In the illustrated embodiment, BIOS 117 includes a predefined memory or memory region that may be referred to as NVM (Non-Volatile Memory) mailbox 106. In such an implementation, mailbox 106 may provide a secured storage location for use in storing workspace access policies, signatures, cryptographic keys or other data utilized to host and validate a workspace on IHS 100. In certain embodiments, BIOS mailbox 106 may be utilized as a secure storage utilized by a remote orchestration service in order to store access policies and cryptographic keys for use in delivering and deploying a secured workspace on IHS 100. BIOS mailbox 106 and secured storage 120 in system memory 105 may be utilized in this manner instead of, or in conjunction with, out-of-band functions implemented by trusted controller 115.

In certain embodiments, trusted controller 115 is coupled to IHS 100. For example, trusted controller 115 may be an embedded controller (EC) that is installed as a component of the motherboard of IHS 100. In various embodiments, trusted controller 115 may perform various operations in support of the delivery and deployment of a workspace to IHS 100. In certain embodiments, trusted controller 115 may interoperate with a remote orchestration service via an out-of-band communications pathway that is isolated from the OS that runs on IHS 100. Network interface 109 may support such out-of-band communications between trusted controller 115 and a remote orchestration service.

Trusted controller 115 may receive cryptographic information required for secure delivery and deployment of a workspace to IHS 100. In such embodiments, the cryptographic information may be stored to secured storage 121 maintained by trusted controller 115. Additionally, or alternatively, trusted controller 115 may support execution of a trusted operating environment that may support cryptographic operations used to deploy a workspace on IHS 100. Additionally, or alternatively, trusted controller 115 may support deployment of a workspace within the OS of IHS 100 via an out-of-band communications channel that is isolated from the OS and allows the workspace to communicate with a trusted agent process of the OS.

Trusted controller 115 may also provide support for certain cryptographic processing used to support secure deployment and operation of workspaces on IHS 100. In some embodiments, such cryptographic processing may be provided via operations of a secure operating environment hosted by trusted controller 115 in isolation from the software and other hardware components of IHS 100. In some embodiments, trusted controller 115 may rely on cryptographic processing provided by dedicated cryptographic hardware supported by the IHS, such as a TPM (Trusted Platform Module) microcontroller. In some embodiments, the secured storage 121 of trusted controller 115 may be utilized to store cryptographic information for use in authorization of workspaces.

As described, an IHS 100 may support one or more workspaces, where an individual workspace provides operation of software programs and access to protected data in varying degrees of isolation from the operating system of the IHS and from other workspaces. As described in additional detail below, in some embodiments, IHS 100 may utilize TPM policies to manage and authenticate a remote orchestrator that supports a workspace operating on the IHS. The TPM of an IHS may support a variety of policies used to managed various permissions and security protocols on an IHS. One type of policy that may be supported by a TPM is an authorization policy, where the TPM manages the authorization policy and determines whether an entity, such a software process, IHS or induvial, is authorized to perform actions specified by the policy. The TPM determines whether an entity is authorized to perform actions specified by the policy based on cryptographic credentials that are presented by the entity. In some instances, the authorization policy may be configured such that only the entity that configures the authorization policy may modify the entities that are authorized to perform actions specified by the policy. As described in additional detail below, embodiments may utilize such TPM authorization polices in managing remote orchestrators that are authorized administrators of workspaces operating on the IHS in a manner that support transfer of control of a workspace between orchestrators, whether for full-time administration or to support a specific service action on the workspace.

In certain embodiments, trusted controller 115 may be additionally configured to calculate signatures that uniquely identify individual components of IHS 100. In such scenarios, trusted controller 115 may calculate a hash value based on the configuration of a hardware and/or software component coupled to IHS 100. For instance, trusted controller 115 may calculate a hash value based on all firmware and other code or settings stored in an onboard memory of a hardware component, such as a network interface 109. Such hash values may be calculated as part of a trusted process of manufacturing IHS 100 and may be maintained in the secure storage 121 as a reference signature.

Trusted controller 115 may be further configured to recalculate a hash value at a later time for such a component. The hash value recalculated for the component may then be compared against the reference hash value signature in order to determine if any modifications have been made to a component, thus indicating the component has been compromised. In this manner, trusted controller 115 may be used to validate the integrity of hardware and software components installed on IHS 100. In certain embodiments, remote orchestration service 206 may verify the integrity of trusted controller 115 in the same manner, by calculating a signature of trusted controller 115 and comparing it to a reference signature calculated during a trusted process for manufacture of IHS 100. In various embodiments, one or more of these operations supported by trusted controller 115 may be implemented using BIOS 117.

Trusted controller 115 may also implement operations for interfacing with a power adapter in managing power for IHS 100. Such operations may be utilized to determine the power status of IHS 100, such as whether IHS 100 is operating from battery power or is plugged into an AC power source. Firmware instructions utilized by trusted controller 115 may be used to operate a secure execution environment that may include operations for providing various core functions of IHS 100, such as power management and management of certain operating modes of IHS 100 (e.g., turbo modes, maximum operating clock frequencies of certain components, etc.).

In managing operating modes of IHS 100, trusted controller 115 may implement operations for detecting certain changes to the physical configuration of IHS 100 and managing the modes corresponding to different physical configurations of IHS 100. For instance, where IHS 100 is a laptop computer or a convertible laptop computer, trusted controller 115 may receive inputs from a lid position sensor 112 that may detect whether the two sides of the laptop have been latched together to a closed position. In response to lid position sensor 112 detecting latching of the lid of IHS 100, trusted controller 115 may initiate operations for shutting down IHS 100 or placing IHS 100 in a low-power mode.

IHS 100 may support the use of various power modes. In some embodiments, the power modes of IHS 100 may be implemented through operations of trusted controller 115 and/or the OS of IHS 100. In various embodiments, IHS 100 may support various reduced power modes in order to reduce power consumption and/or conserve battery power when IHS 100 is not actively in use, and/or to control a level of performance available to the user by increasing or decreasing a maximum operating clock frequency of a component of IHS 100 (e.g., processor(s) 101).

In some embodiments, an IHS 100 may not include all of the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as a System-on-Chip.

Figure 2:
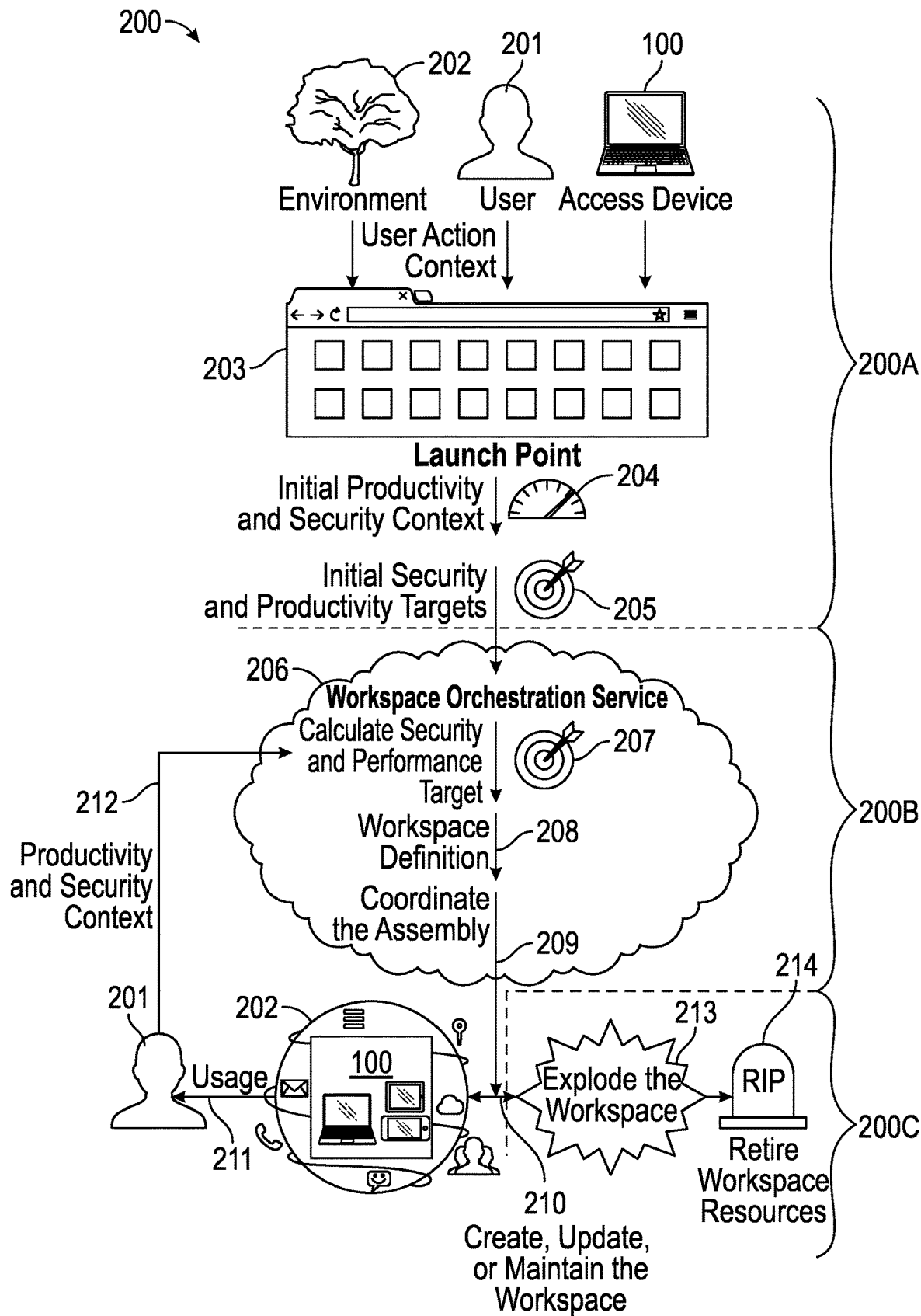
FIG. 2 is a diagram depicting a system and procedure for deploying and maintaining workspaces operating on an IHS, where the system is configured, according to various embodiments, to transfer control of remote orchestration of a workspace operating on the IHS.

FIG. 2 is a diagram depicting an example of method 200 for securing a dynamic workspace in an enterprise productivity ecosystem in a manner that supports transfers of control of remote orchestration of a workspace operating on an IHS. For sake of illustration, method 200 has been split into three phases: workspace initialization phase 200A, workspace orchestration phase 200B, and workspace termination phase 200C. During initialization 200A, user 201 (e.g., an enterprise user) operates an IHS 100 (e.g., a desktop, a laptop, a tablet, a smart phone, etc.) such as described with regard to FIG. 1 within physical environment 202 (e.g., any type of environment and its associated context, including physical location, geographic location, location within a particular facility or building, detected networks, time of day, proximity of the user, individuals in the vicinity of IHS 100, etc.).

Method 200 starts with an action by user 201 at a launch point 203 that may be, for example, a corporate launch point provided by an employer of user 201, a launch point 203 provided by the manufacturer of IHS 100, or a launch point provided as a service to user 201 by a third-party. Particularly, user 201 operates IHS 100 to access launch point 203 that is provided, for example, in the form of a web portal, a portal application running in the OS of IHS 100, a special-purpose portal workspace operating on IHS 100, or the like. In various implementations, launch point 203 may include Graphical User Interface (GUI) elements representing different software applications, data sources and/or other resources that the user may desire to execute and/or manipulate. In various embodiments, launch point may provide a graphical, textual and/or audio interface by which data or other resource may be requested by a user 201. As such, authenticated user 201 may be provided a launch point that provides visibility as to one or more software applications and an aggregation of user's data sources available across all of their datastores (e.g., local storage, cloud storage, etc.).

As described in additional detail below, workspaces for providing user 201 with access to requested data or other resources may operate using a local management agent 332 that operates on IHS 100 and is configured to interoperate with workspace orchestration service 206, but may be restricted to interfacing with a particular remote orchestrator in support of a workspace operating on the IHS. In some embodiments, the local management agent 332 may be limited to interfacing with a specific remote orchestrator in support of a workspace, where the specific remote orchestrator is identified and authenticated based on credentials that are provided by the orchestrator and that may be validated by a trusted permission manager of the IHS, such as a TPM module.

In various embodiments, launch point 203 may be provided in the form of a portal (e.g., a webpage, OS application or special purpose workspace) that allows user 201 to request access to managed resources. In various embodiments, launch point 203 may be hosted by remote workspace orchestration service 206, local management agent 332 on IHS 100, or any suitable combination thereof. Examples of launch point 203 technologies may include WORKSPACE ONE INTELLIGENT HUB from WMWARE, INC., and DELL HYBRID CLIENT from DELL TECHNOLOGIES INC., among others.

Initialization phase 200A begins when user 201 chooses to launch an application or access a data source managed by workspace orchestration service 206. In response to an access request issued by user 201 (e.g., the user "clicks" on an icon of launch point 203), local management agent 332 of IHS 100 collects initial security and productivity context information at 204. For example, security context information may include attributes indicating a security risk associated with: the data and/or application being requested, a level of risk presented by the user 201, the hardware utilized by IHS 100, the logical environment of IHS 100 in which a workspace will be deployed to provide access to the requested data and/or application, and the physical environment 202 in which IHS 100 is currently located.

Accordingly, in this disclosure, the term "security context" generally refers to data or other information related to a security posture in which a workspace will be deployed and utilized, where the security posture may be based on the user, IHS 100, data to be accessed via the workspace, and/or environment 202. A security context may be quantified as a security risk score in support of evaluations of the level or risk associated with providing user 201 access to requested data and/or application while using IHS 100 in the particular context. A "security risk score" generally refers to a numerical value usable to score, quantify, or measure various security characteristics of the security context associated with a request. A risk score may be an aggregate score associated with the overall security risk context, whereas a "risk metric" may be a measurement of risk for a sub-category of some part of the security context.

For example, security metrics that may be used in the calculation of a security risk score for a particular security context may include, but are not limited to: a classification of the requested data source and/or application, authentication factors used to identify user 201, the location of IHS 100, a role or other group classifications associated with user 201, validation of networks in use by IHS 100, type of network in use by IHS 100, network firewall configurations in use by IHS 100, indicators of attack (IoA), indicators of compromise (IoC) regarding IHS 100 or a resource being requested by user 201, patch levels associated with the OS and other applications in use on IHS 100, availability of encryption, type of available encryption, access to secured storage, use of attestable hardware by IHS 100, supported degree of workspace isolation by IHS 100, etc.

The term "productivity context" generally refers to user productivity associated with a workspace, user, IHS, or environment. A "productivity score" generally refers to an index usable to score, quantify, or measure various productivity characteristics of a productivity context. Examples of productivity context information include, but are not limited to: the hardware of the IHS, the software of the IHS, including the OS, power states and maximum clock frequencies of selected components of the IHS, peripheral devices coupled to the IHS, either permanently or temporarily, networks available to the IHS and the performance characteristics of those networks, software installers available on the IHS, etc.

Initial productivity and security targets for a workspace may be calculated based on the context of user's 201 actions combined with the productivity and security context in which the workspace will operate. The productivity and security targets may also be based on user's 201 behavioral analytics, IHS 100 telemetry and/or environmental information (e.g., collected via sensors 112). In some cases, at 205, a local management agent operating on IHS 100 may calculate initial security and productivity targets based upon the collected security and productivity context. In other cases, remote workspace orchestration service 206 may calculate security and productivity targets.

As used herein, the term "security target" generally refers to the attack surface presented by a workspace that is created and operated based on a workspace definition, while the term "productivity target" generally refers to the productivity characteristics of a particular workspace definition.

Examples of a productivity target include, but are not limited to: type of data or data source available to user 201, minimum latency of a workspace, etc. Conversely, attributes that may be used to characterize a security target may include, but are not limited to: a minimum security score for a workspace, a minimum trust score of IHS 100, authentication requirements for user 201 (e.g., how many authentication factors are required, frequency of re-authentication), minimum level of trust in the network utilized by a workspace, required isolation of a workspace from IHS 100, the ability to access browser within a workspace, the ability to transfer data between workspaces, the ability to extend a workspace, etc.

Moreover, the term "workspace definition" generally refers to a collection of attributes that describe aspects a workspace that may be assembled, created, and deployed in a manner that satisfies a security target (i.e., the definition presents an attack surface that presents an acceptable level of risk) and a productivity target (e.g., data access, access requirements, upper limits on latency, etc.) in light of the security context (e.g., location, patch level, threat information, network connectivity, etc.) and the productivity context (e.g., available device type and performance, network speed, etc.) in which the workspace is to be deployed. A workspace definition may enable fluidity of migration of an instantiated workspace, since the definition supports the ability for a workspace to be assembled on any target OS or IHS that is configured for operation with the workspace orchestration service 206.

In describing capabilities and constraints of a workspace, a workspace definition 208 may prescribe one or more of: authentication requirements for user 201, containment and/or isolation of the workspace (e.g., local application, sandbox, docker container, progressive web application or "PWA," Virtual Desktop Infrastructure "VDI," etc.), primary applications that can be executed in the defined containment of the workspace to enable user 201 to be productive with one or more data sources, additional applications that enhance productivity, security components that reduce the scope of the security target presented by the productivity environment (DELL DATA GUARDIAN from DELL TECHNOLOGIES INC., an anti-virus, etc.), the data sources to be accessed and requirements for routing that data to and from the workspace containment (e.g., use of VPN, minimum encryption strength), workspace capabilities to independently attach other resources; etc. In some embodiments, the workspace definition 208 selected for operation of a workspace may specify a computing architecture for use in the operation of the workspace.

In some implementations, workspace definitions may be based at least in part on static policies or rules defined, for example, by an enterprise's Information Technology (IT) Decision Maker (ITDM). In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then workspace orchestration service 206 may autonomously add that application to the default workspace definition for that user.

Still with respect to FIG. 2, during orchestration 200B, the initial security and productivity targets are processed and/or reconciled against resources, device capabilities, and cloud services available, etc., to produce a workspace definition at 208. In some embodiments, a workspace definition 208 may specify one or more software resources from which a workspace may operate. The workspace definition 208 may also specify various capabilities and constraints of a workspace, such as: runtime security requirements of the workspace containment (e.g., such as isolation from the OS of IHS 100 or from certain hardware of IHS 100), the use of reference measurements to attest to the integrity of the workspace once running, applications to be provided for operation within the workspace, aggregation of resources available via the workspace, access configurations (e.g., virtual private network or "VPN"), etc. In some embodiments, the workspace definition 208 may also specify a remote orchestrator that is authorized to administer or otherwise manage the operations of the workspace once it has been deployed. In addition or in alternative, in some embodiments, the workspace definition 208 may specify a policy that will be used to govern orchestration of the workspace, and in particular the entities that are authorized to orchestrate the workspace. In some embodiments, such polices specified in the workspace definition may include TPM authorization policies that specify entities that are authorized to perform orchestration tasks for the workspace. In some embodiments, the workspace definition 208 may specify the authorized orchestrators for the workspace without identifying the authorization policy by which the orchestrators have been authorized as administrators of the workspace.

The initial workspace definition may then be utilized by automation engine 302 of workspace orchestration service 206 to coordinate assembly 209 and instantiation 210 of a workspace using a selected computing architecture of the IHS 100 in which the workspace will operate. In particular, the automation engine 302 may assemble a set of software resources for use by the workspace. For instance, in cases where a workspace is to be partly cloud-hosted, automation engine 302 may assemble a workspace that specifies one or more resources to support the local operations on the IHS 100, such as a web-based container, and one or more resources that interface with the cloud hosted portion of the workspace. In some embodiments, automation engine 302 may receive inputs from a human administrator in selecting the containers for use by a workspace.

Once the workspace has been deployed according to its workspace definition, the instantiated workspace is operated by user 201 at 211, and new productivity and security context information related to the behavior or use of data is generated at 212. This operation of a workspace may result in a change or new classification of data based upon what user 201 has done, accessed, and/or created, thus resulting in a change to the security context of the workspace. To the extent the user's behavioral analytics, device telemetry, and/or the environment has changed to a quantifiable degree, these changes in security context may serve as additional input for a reevaluation of the security and performance targets at 207 by automation engine 302. Additionally, or alternatively, new workspace context, security target, and/or productivity target may be now measured against the initial targets, and the result may cause automation engine 302 to produce a new workspace definition at 208, if appropriate.

Particularly, if an instantiated workspace has parameters that fall outside of the range of the target indexes such that a difference between additional or updated context information and the initial or previous context information is scored below a threshold value, automation engine 302 may process the assembly of modifications to an existing workspace and deploy such modifications at 210. Conversely, if the difference between the additional or updated context information and the initial or previous context information is scored above a threshold value, automation engine 302 may generate a new workspace at 210. Session data metadata and context may be preserved by data aggregation engine 336, and session data may be restored as applicable.

Additionally, or alternatively, method 200 may terminate or retire the initial or previous workspace at 213, as part of termination phase 200C. In some cases, user action may initiate the termination process (e.g., user 201 closes application or browser accessing data) and/or termination may take place automatically as part of an adjustment in workspace definition (e.g., the isolated environment is instructed to terminate by automation engine 302). Still as part of termination phase 200C, workspace resources of IHS 100 and/or workspace orchestration service 206 may be released. As described in additional detail below, this workspace lifecycle may be administered by remote orchestrators that are part of the remote orchestration service 206, with embodiments providing capabilities by which authorization for orchestration of a workspace may be transferred between different orchestrators.

As such, in various embodiments, method 200 enables secure user productivity even when a workspace operates on an IHS or cloud platform that is not under direct management. Method 200 also provides for dynamic or adaptive configurations and policies allowing for the best possible user experience while maintaining appropriate level of security. In some cases, the definition of a productivity environment and access requirements may be selected based upon productivity and security dependencies and targets, and the definition of capabilities related to the workspace may be adaptive in nature. Particularly, workspace definition attributes, including the software resources selected for use by the workspace, may be dynamically selected based upon historical productivity and security information, based upon each individual user or group's behavior.

Figure 3A:
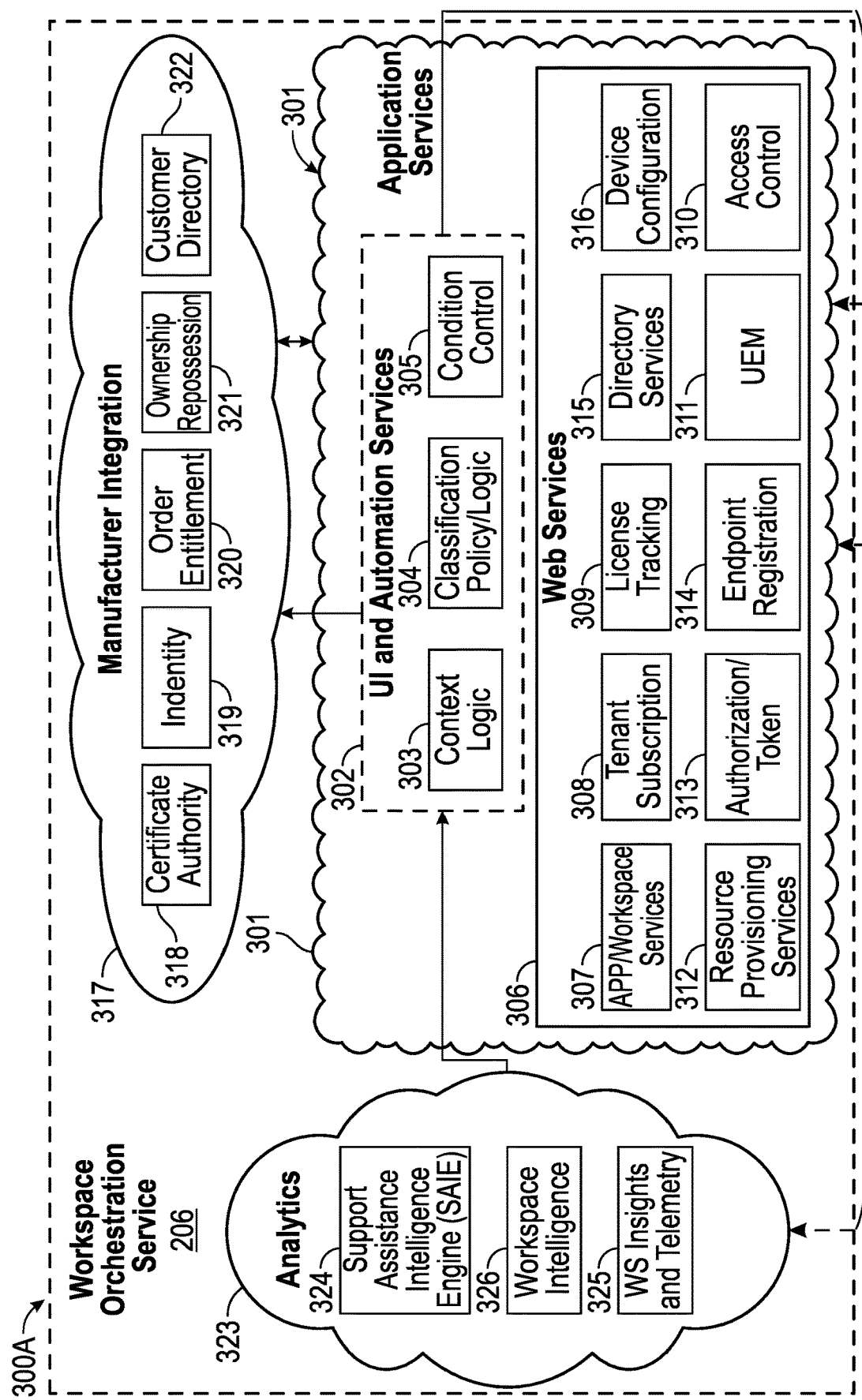
FIGS. 3A and 3B are a diagram depicting an example of a system configured for deploying and maintaining workspaces operating on an IHS, where the system is configured, according to various embodiments, to transfer control of remote orchestration of a workspace operating on the IHS.
Figure 3B:
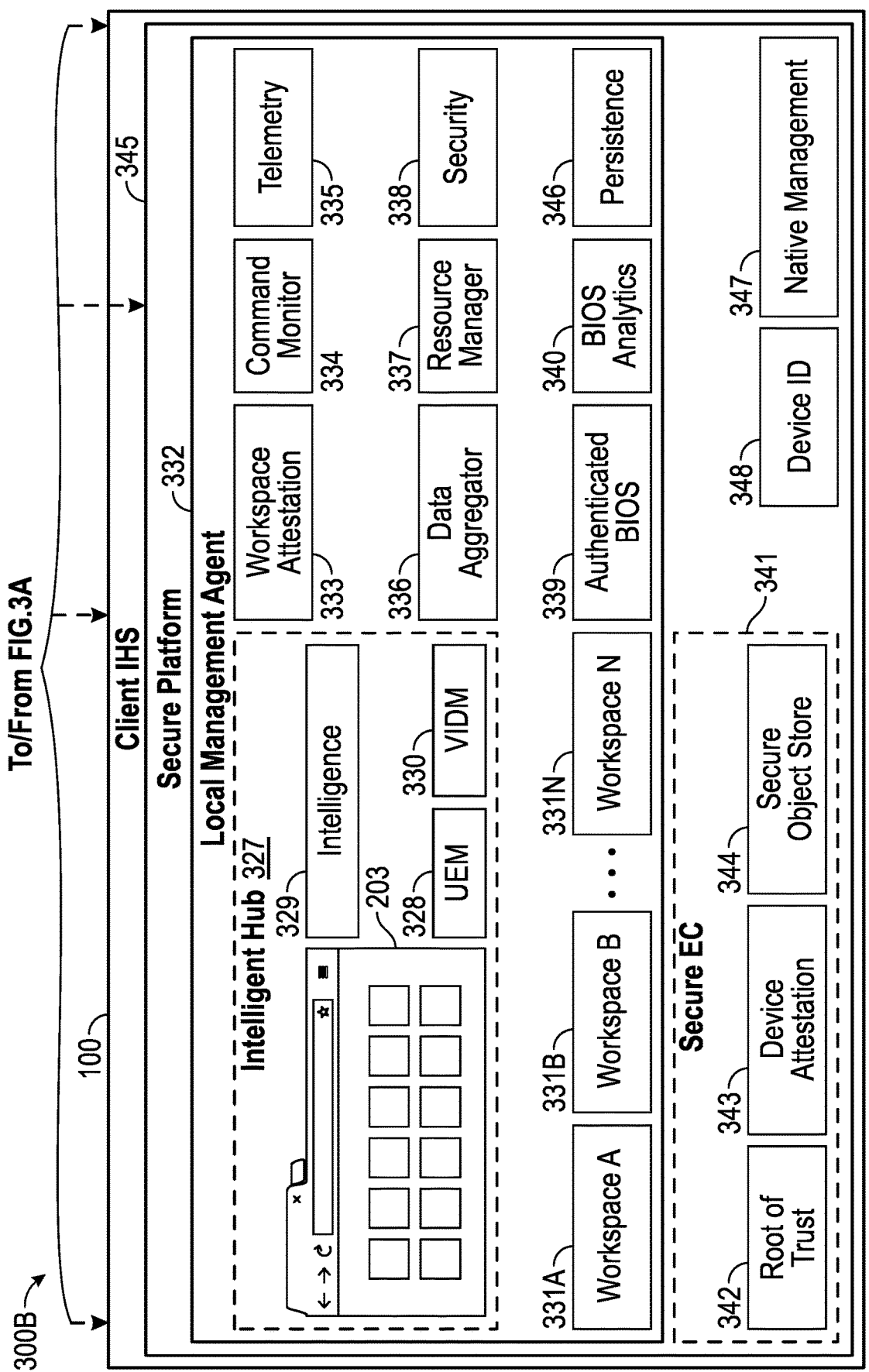

FIGS. 3A and 3B show a diagram of an example of system components 300A and 300B (collectively referred to as "system 300") configured to modernize workspace and hardware lifecycle management in an enterprise productivity ecosystem in a manner that supports transfer of control of remote orchestration of a workspace operating on the IHS 100. Particularly, system 300 may include one or more servers, or other IHSs, remotely located and/or networked having program instructions stored thereon that, upon execution, cause the one or more servers to perform various workspace orchestration operations described herein, including, but not limited to: the dynamic evaluation of security and productivity targets based upon updated context information received from IHS 100, the calculation of risk scores and other productivity and security metrics based on ongoing collection of context information, the generation of workspace definitions, and the assembly of one or more files or policies that enable the instantiation of a workspace in accordance with a workspace definition at a cloud service and/or IHS 100. As described in additional detail below, the components of the workspace orchestration service 206 that are authorized to perform such types of orchestration operations for a workspace may be modified in order to support ongoing use and administration of the workspace.

System 300 may include program instructions that, upon execution, cause IHS 100 to perform various local management operations described herein, including, but not limited to, the collection of productivity and security context information, the calculation of productivity scores and/or risk scores, the instantiation, execution, and modification of a workspace based upon files, definitions, or policies, such as workspace definitions.

Components 300A and 300B of system 300 may be coupled to and/or in communication with each other via any suitable network technology and/or protocol, which allows workspace orchestration service 206 to be remotely provided with respect to local management agent 332. As described with regard to FIG. 1, an IHS according to embodiments may include a component such as a trusted controller that may support certain secure out-of-band communications that are independent from the OS of IHS 100. In some embodiments, such a trusted controller may be configured to support deployment and operation of local management agent 332 and/or to report changes in context to workspace orchestration service 206. In some embodiments, capabilities of a trusted controller of IHS 100 may be utilized by the workspace orchestration service 206 in validating the integrity of the software resource in use by an IHS in the operation of a workspace. In some embodiments, capabilities of a trusted controller of IHS 100 may be utilized by the workspace orchestration service 206 in transferring control of orchestration for a workspace.

As illustrated in system component 300A of FIG. 3A, workspace orchestration service 206 may include a number of sub-components that support deployment and ongoing evaluation and adaptation of workspaces on IHS 100. Embodiments of workspace orchestration service 206 may include systems that may support: web services 306, manufacturer integration 317, and analytics 323. Moreover, web services 306 may comprise application services 301 and user interface (UI) and automation services 302.

Analytics services 323 may be configured to receive and process context information from IHS 100, both during initial configuration of a workspace and in ongoing support of workspaces, and to provide that information, along with any analytics generated, to context logic 303 of application services 301. Based on information collected during the deployment and ongoing support of workspaces, support assistance intelligence engine (SAIE) 324 may be configured to generate and/or analyze technical support information (e.g., updates, errors, support logs, etc.) for use in diagnosing and repairing workspace issues. Workspace insights and telemetry engine 325 may be configured to analyze and/or produce device-centric, historical, and behavior-based data (e.g., hardware measurements, use of features, settings, etc.) resulting from the operation of workspaces. Workspace intelligence module 326 may include any suitable intelligence engine for processing and evaluating context data in order to identify patterns and tendencies in the operation of workspaces and in the adaptation of workspaces based on context changes.

Application services 306 system of workspace orchestration service 206 includes UI and automation services 302 system that may include context logic or engine 303, classification policy 304, and condition control module or engine 305. Context logic or engine 303 may support processing of context information in making risk assessments (e.g., evaluating the risk associated requests by the user against the context of the user's behavior, history of the user's IHS, capabilities of the user's IHS, and environmental conditions). For instance, security context information collected by IHS 100 may be provided to workspace orchestration service 206 where it may be used, such as by context logic 303, to calculate a risk score associated with a request for use of a managed data source and/or application. Classification policy 304 may include administrator and machine-learning defined policies describing risk classifications associated with different security contexts, such as risk classifications for specific data, locations, environments, IHSs, logical environments, or user actions (e.g., use of high-risk data requires use of a workspace definition suitable for use with a risk score above a specific value). Condition control module or engine 305 may include intelligence providing automated decision making for appropriately aligning risk and context. In some cases, condition control module or engine 305 may dynamically deploy a solution to address any detected misalignment of risk and context. For instance, upon requesting access to a highly classified data source that results in a significant increase in risk score, the condition control engine may select workspace definition modifications that implement security procedures that are suitable for the higher risk score. For example, in response to a detected increase in the risk score associated with a workspace deployment, embodiments may support redeployment of the workspace using a different set of software resources, thus altering the architecture of the workspace in a manner that implements additional security procedures.

Application services 301 may include a group of web services 306 called on by UI and automation services 302 to support various aspects of the orchestration of workspaces. Particularly, web services 306 may include application and workspace services 307 that may assemble and package containers or other software resources for deployment by a workspace (e.g., an ".msix" file packaged and deployed to a MICROSOFT HYPER-V container). In some embodiments, a workspace definition may be used to specify whether a user will be provided access to an application in this manner. Web services 306 may also include a tenant subscription module 308, that performs dynamic configuration of an IHS and deployment of the described workspace orchestration services at the point-of-sale (POS) of an IHS. A license tracking module 309 may be used to maintain and track license information for software, services, and IHSs. An access control module 310 may provide top level access controls used in controlling access to data and applications by authorized users. A Unified Endpoint Management (UEM) module 311 may be configured to support the described orchestration of workspaces on various different IHSs that may be utilized by a particular user.

Web services 306 that may be used in support of workspaces may further include resource provisioning services 312 for configuring an IHS or workspace with secrets/credentials necessary to access specific resources (e.g., credentials for use of VPNs, networks, data storage repositories, workspace encryption, workspace attestation, and workspace-to-device anchoring). In some cases, resource provisioning services 312 may include secrets provisioned as part of a trusted assembly process of IHS 100 and, in some instances, associated with a unique identifier 348 of the IHS 100. Web services 306 may also include an authorization/token module that provides identity functions and may connect to various authentication sources, such as, for example, Active Directory. Endpoint registration module 314 may be configured to register IHSs and/or workspaces with management service that tracks the use of the described workspace orchestration. In some scenarios, a directory services 315 module may be configured to provide active directory services (e.g., AZURE ACTIVE DIRECTORY from MICROSOFT). Device configuration services 316 enable central configuration, monitoring, managing, and optimization of workspaces that in certain contexts may operate remotely from an IHS and may only present the user of the IHS with an image of the workspace output. In cooperation with resource provisioning services 312, device configuration services 316 may also handle secret creation and IHS configuration.

Still referring to FIG. 3A, manufacturer integration components 317 may communicate with application services 301 and client IHS 100 to provide features that are usable during workspace evaluation and instantiation, where these features are based upon information available to the manufacturer of client IHS 100. For instance, certificate authority 318 may include an entity that issues digital certificates that may be used in validating the authenticity and integrity of the hardware of IHS 100 and/or of the workspace definition generated by the orchestration service 206. Identity service module or engine 319 may be configured to manage the user's or owner's identity as well as brokering identification for use of customer directory 322. Order entitlement module or engine 320 may be responsible for managing the entitlements purchased as well as the associated issued certificates signed by 318. Ownership repository 321 may manage user entitlements associated with IHSs and their ownership and may provide support for users transferring ownership of an IHS and conveying the entitlements associated with that IHS. In certain scenarios, ownership repository 321 may use this transfer of ownership to decommission the secrets associated with the entitlements embedded in the IHS. Customer directory 322 may be configured to authenticate and authorize all users and IHSs in a network, such as assigning and enforcing security policies for all IHSs and installing or updating software (in some cases, customer directory 322 may work in cooperation and/or may be the same as directory services 315).

Referring now to IHS 100 of FIG. 3B, in some embodiments, IHS 100 may be configured to operate local management agent 332 that may run within a secure execution environment 345 hosted by trusted controller 341, such as trusted controller 115 of FIG. 1. In other embodiments, local management agent 332 may operate as a trusted and attestable process of the OS of IHS 100. In some embodiments, local management agent 332 may include a workspace engine suitable for instantiating and managing the operation of one or more workspaces 331A-N on IHS 100. As described, the capabilities of a workspace may be modified based on changes in the productivity and security contexts in which the workspace is operating. Accordingly, the workload(s) in each of workspaces 331A-N may be hosted in a public cloud, a private cloud, a specific server, or locally hosted in full or in part on IHS 100, depending on the context in which the workspace is operating. These allocations of computing resources that comprise the computing architecture for each particular workspace 331A-N may be individually prescribed by the respective workspace definition that is used to build and operate each workspace. As described, the workspace definition may be created by workspace orchestration service 206 based upon context information provided by IHS 100, security targets for each workspace 331A-N, and productivity targets for each workspace 331A-N. As described in additional detail below, in some embodiments, the workspace orchestration service 206 may interoperate with local management agent 332 in management of workspaces operating on the IHS, where a specific orchestrator of the service 206 may be authorized to administer the workspace, and where control of remote orchestration of a workspace may be transferred between orchestrators, such as to support specific administrative service actions by a specialized orchestrator of service 206.

In some embodiments, local management agent 332 may be configured to host, launch, and/or execute a workspace hub 327 that provides a launch point 203 by which users may initiate workspaces through the selection of managed data and resources. In various embodiments, launch point 203 may be an agent, application, special-purpose workspace or web portal the provides an interface by which a user may select from an aggregated collection of data sources, applications, calendars, messages or other managed information or resources that are available to the user of IHS 100 via operation of a workspace as described herein. In various embodiments, the launch point 203 may be provided in the form for textual, graphical and/or audio user interfaces that allow a user of IHS 100 to select available data and/or resources. In some embodiments, workspace hub 327 may utilize a local environment management module 328 in providing the workspace interface that is presented to the user on IHS 100 and doing so in a consistent manner across workspaces 331A-N. Workspace hub 327 may also include a local intelligence logic or engine 329 used to support modeling the use of IHS 100 in order to improve characterization of the actual risk associated with a risk context. User authentication and access control operations may be performed by a local identity module 330 that may interface with trusted controller 341 in providing user authentication.

In some cases, each instantiated workspace 331A-N may be an environment that provides a user with access to requested data or applications, where the environment may operate using a computing architecture that may be isolated in varying degrees from the hardware and software of IHS 100 based on the security context and productivity context in which each workspace 331A-N is operating. In some instances, the selection of a data source or resource that are available to user via launch point 203 may result in launching a new workspace. For instance, if a user launches a browser through selection of an icon displayed by launch point 203, a new workspace may be created and launched according to a workspace definition that has been selected for providing the user access to a web browser in the security and productivity contexts in which the request has been made. In a scenario where the user double clicks on a confidential presentation file available from a data source that is provided by launch point 203, an additional workspace may be instantiated with a presentation application providing access to the requested presentation file, where this new workspace is created based on a workspace definition that provided appropriate security for access to the confidential presentation). In other instances, a selection of the presentation file by a user may result in the presentation being made available through the existing workspace, in some cases using the existing workspace definition and, in other cases, using a workspace definition that has been modified to support the requested access to the confidential presentation file. In some embodiments, such modifications may be implemented through modifications to the software resources that are available for use by the workspace.

Although workspaces 331A-N supported by IHS 330B may each be isolated to varying degrees from the hardware and/or software of IHS 100 and from each other, a user of IHS 330B may expect to be able to operate the multiple workspaces 331A-N in a manner that allows content to be transferred between the different workspaces 331A-N. For instance, a user may select a portion of the data displayed in workspace 331A and utilize OS or other workspace functions to copy the data for copying to workspace 331B. In some embodiments, such capabilities may be enabled based on the software resources that are available for use by the workspace In various embodiments, local management agent 332 may operate in full or in part on secure platform 345 hosted by trusted controller 341, such as described with regard to FIG. 1, that operates independent from the OS of IHS 100. In some embodiments, all or part of local management agent 332 may operate as trusted components of the OS of IHS 100. To execute the various operations described herein, local management agent 332 may include command monitor 334 configured to provide instrumentation to receive commands from workspace orchestration service 206 in support of the workspaces operating on the IHS. For instance, such commands supported by local management agent 332 may provide for a workspace definition to be specified for an individual workspace 331A-N. In some embodiments, such commands supported by local management agent 332 may further support transfer of control of remote orchestration of a workspace operating on the IHS and may further support validation of an orchestrator as an authorized administrator of a particular workspace. Local management agent 332 may also include telemetry module 335 that may be configured for communicating collected information to workspace orchestration service 206, including reporting changes in context that may warrant adjustments to workspaces 331A-N. Data aggregator 336 may track all of the data source and other resources (e.g., applications, local or cloud-based services) that may be provided to the user via a workspace.

Local management agent 332 may utilize resource manager module 337 that is configured to manage access to data, network configuration, such as for VPNs and network access, identity information, access control, and resource provisioning services. Security module 338 may be configured to provide various security service, including interfacing with a TPM of the IHS in order to determine whether credentials presented by a remote orchestrator correspond to credentials that identify the authorized administrators of the workspace. BIOS interface 339 may provide a secure BIOS interface used for accessing and managing credentials in secure object storage. BIOS analytics module 340 may be configured to perform forensic services for BIOS telemetry and health assessments. Persistence module 346 may be configured to support persistence of applications entitled at a POS or assigned by administrators and supported with required license tracking. Workspace attestation module 333 may provide a platform centric service layer on top of a container engine provided by local management agent 332 and may be used to measure and attest workspaces 331A-N in any suitable manner defined or orchestrated by condition control module 305. In some embodiments, workspace attestation module 333 may support validation of the integrity of software resources specified in a workspace definition.

As part of secure platform 345, native management module 347 may be configured to enable an out-of-band management interface for interoperation with workspace orchestration service 206, where this OOB interface operates independent form the OS of IHS 100. In some embodiments, the OOB management interface supported by native management module 347 may be utilized by the device configuration services 316 of the workspace orchestration service to access the secure platform services 345 of IHS 100. For instance, in some embodiments, the OOB interface may be utilized by the remote orchestration service in interfacing with trusted components of the IHS, such as the trusted controller and/or the TPM of IHS 100, such as to manage the orchestrators that are authorized to administer a specific workspace.

Digital device ID module 348 may provide a unique, un-spoofable, cryptographically bound identifier. In embodiments supporting a secure platform 345, secure embedded controller 341 may be a hardened hardware module that may include a root of trust module 342 configured as a trusted data store and, in some cases for cryptographic processing, that may be trusted within a cryptographic system. A device attestation service 343 may be configured to perform device assurance and trust services (e.g., secure BIOS and secure boot, etc.). A secure object store 344 may be provided that is configured to lock and access keys, hashes, and/or other secrets in an EC and/or TPM.

In some scenarios, IHS 100 may be provisioned by a manufacturer that also controls manufacturer integration components 317, workspace attestation module 333 may operate in conjunction with secure object store 342, authenticated BIOS module 339, and/or digital device identity module 348, etc., to further secure and/or control productivity features available in any of workspaces 331A-N based upon hardware devices and settings unique to that IHS and/or designed specifically by that manufacturer.

To further illustrate how the systems and methods described herein operate to modernize workspace and hardware lifecycle management in an enterprise productivity ecosystem, three non-limiting use cases or examples are discussed in turn below.

Use Case A

In use case A, a given user may request access to a protected data source on the enterprise's premise using a corporate-owned and imaged notebook computer, which may be configured as described with regard to IHS 100 of FIG. 1 and client IHS 100 of FIG. 3B.

In response to the request, a local management agent 332 operating on the user's notebook retrieves information describing the context and calculates security and productivity targets based on the determined context information. In this use case, the local management agent may have been installed by an IT administrator, and it may be running in the background as a service. When the user selects the protected data, such as via a selection via the OS of the notebook, the local management agent notifies the workspace orchestration service of the request and for a workspace definition for a workspace by which the user may be provided access to the protected data. The confidential data may be associated with the local management agent on the IHS, based on file classification (e.g., file metadata/type/properties/permissions, folder location, encrypted region, etc.). The local management agent may continuously collect context information and send it to the orchestration service for use in scoring the risk and productivity of the workspace (this may also be done at the time of the user's access request or indication of intent).

In this example, the workspace orchestration service may score an overall security risk to have a value of "2," using a weighed, machine learning, or artificial intelligence algorithm, based upon the following risk context information or inputs, each of which may be a risk metric selected based upon a policy: locale (e.g., a safe locale with a risk score of 1); user persona (e.g., a high-confidence in a sophisticated user classification-a user whom historically does not click on phishing emails with a risk score of 1); network risk (e.g., a low risk score of 1 based on use of a wired network connection); IHS risk (e.g., a risk score of 1 based on a high level of control because of corporate owned/managed platform using known software versions with security features enabled); regulatory risk (e.g., a risk score of 1 based on user, data, location combinations—e.g., No restrictions with respect to General Data Protection Regulation or "GDPR," Health Insurance Portability and Accountability Act "HIPAA," Payment Card Industry "PCI," technology export, etc.); and data type risk (e.g., a risk score of 8 based on a confidential datafile being requested).

The workspace orchestration service may also calculate a productivity score to have a value of "9," using a weighed, machine learning, or artificial intelligence algorithm, based upon the following context information or inputs, each of which is also given as a resource metric based upon a selected policy: locale: 10 (office); user persona: 9 (a "skilled" classification based upon advanced compute tasks, proficiency, and/or speed); network speed/latency: 10 (fast, wired, Gigabit Ethernet, or direct to internal network); device performance: 8 (fast, expensive CPU, memory, graphics, but storage only needs—e.g., <10 GB); and data type: 10 (the local, confidential file is easy to read/write with low latency and high performance on local storage).

Second, based upon the security score and/or context information, the workspace orchestration service builds a workspace definition file having any suitable structure with workspace definition attributes in a machine-readable format (e.g., JSON name-value, XML structured, etc.). In this example, the security target may be deemed to have a value of "1" based upon a combination of attributes values representing loads, needs, or demands on security controls and containment features that may include: threat monitoring: 1 (low demand); threat detection: 1 (low demand); threat analytics: 1 (low demand); threat response: 1 (low demand); storage confidentiality: 2 (low); storage integrity: 2 (low); network confidentiality: 1 (low); network integrity: 1 (low); memory confidentiality: 1 (low); memory integrity: 1 (low); display confidentiality: 1 (low); display integrity: 1 (low); user authentication: 1 (low, basic password is fine, non-multifactor authentication or "MFA," no session expiration); IT administrator scope: 1 (administrator manages remotely but does not need heavy remediation software; and regulatory compliance: 1 (no GDPR, No HIPAA, no PCI, no tech export restriction, etc.).

Based upon the productivity target and/or context information, a productivity target for the workspace definition may be deemed to have a value of "9" (defining a high-quality, responsive user experience) based upon a combination of attribute values representing productivity requirements as follows: local storage: 7 (partial hard drive control, some storage reserved for IT load); CPU access: 10 (unlimited); local graphics: 10 (unlimited); and application stack: 10 (can use applications, install applications that the user needs, give them administrator rights, etc.).

Third, after the workspace definition is complete, the workspace orchestration service and the local management agent may assemble the workspace and instantiate it for the user. For example, the local management agent may receive definition files (e.g., JSON, XML, etc.) from the orchestration service, and it may parse the file to implement security risk controls such as: threat monitoring: 1 (local management agent does not install threat, detection, and response or "TDR" software); threat detection: 1 (local management agent does not install TDR software); threat analytics: 1 (orchestration does not need to gather detailed telemetry from the system, OS will not be enrolled in logging); threat response: 1 (local management agent does not install security threat response agent); storage confidentiality: 2 (local management agent deploys a local file-system encryption product that the user can optionally enable on specific files as needed with right-click context menus); storage integrity: 2; network confidentiality: 1 (local management agent confirms basic firewall configuration is correct—e.g., IT GPO-controlled); network integrity: 1; memory confidentiality: 1 (local management agent confirms configuration—e.g., No SGX, TXT, or container/sandbox software deployed); memory integrity: 1; display confidentiality: 1 (local management agent confirms graphics drivers installed, privacy screen and camera optionally managed by user); display integrity: 1; user authentication: 1 (local agent confirms basic GPO password rules are configured, and met by user—e.g., number of characters, no session expiration, etc.); IT administrator scope: 1 (local agent runs with system privilege, confirms IT admin accounts are listed in local admin user group—e.g., per GPO); and regulatory compliance: 1 (local agent does not install any compliance assistance software).

After confirming the configuration, the workspace orchestration service and the local management agent may give the user access to the requested local confidential file, and the user may begin working in a newly created workspace.

Use-Case B

In use-case B, a user may request access to a confidential datafile while at a coffee shop using an open public network and an IT-managed/owned PC, such configured as described with regard to IHS 100 of FIG. 1 and client IHS 100 of FIG. 3B.

First, a local management agent 332 executed by client IHS 100 retrieves the requested context and calculates security and productivity scores based on context. In this use-case, the local management agent may have been installed by IT, and it may be running in the background as a service. The confidential data may be kept on a shared IT-managed network resource on-premises (e.g., back in a main corporate office), and the local management agent may be responsible for monitoring when this data path is requested by the user (e.g., the user hits a specific URL, IP, etc.). Moreover, the local management agent may continuously collect all context and send it to the workspace orchestration service to assist in scoring processes later (this may also be done at the time of the user's access request or indication of intent, rather than a continuous collection).

When the user selects the desired confidential datafile, client IHS 100's OS calls the local management agent associated with the path to the confidential datafile and calls back to a remote workspace orchestration service 206 to request a workspace definition.

In this example, the workspace orchestration service may score an overall security risk to have a value of "4," using a weighed, machine learning, or artificial intelligence algorithm, based upon the following context information or inputs, each of which is also given as a risk metric based upon a selected policy: locale: 5 (public, safe country); user persona: 5 (new user, classification data does not exist yet); network risk: 5 (medium, public but common location, wireless connection detected); device risk: 1 (high level of control, corporate owned/managed platform, known versions, security features enabled, etc.); and regulatory: 1 (based on user, data, location combinations—e.g., no restrictions with respect to General Data Protection Regulation or "GDPR," Health Insurance Portability and Accountability Act "HIPAA," Payment Card Industry "PCI," technology export, etc.).

The workspace orchestration service may also calculate a productivity score to have a value of "5," using a weighed, machine learning, or artificial intelligence algorithm, based upon context information or inputs, each of which is also given as a resource metric based upon a selected policy. For instance, security contexts inputs may include: locale: 6 (remote location but in USA major city, in a public area, non-employees are within visual/audio range of device); user persona: 5 (unknown confidence "null" classification, uses default onboarding assumptions); network speed/latency: 4 (medium, wireless but AC on shared network); and device performance: 8 (fast, expensive CPU, memory, graphics, but storage only needs ~<10 GB).

Second, based upon the security score and/or context information, the workspace orchestration service builds a workspace definition file having any suitable structure with workspace definition attributes in a machine-readable format (e.g., JSON name-value, XML structured, etc.). In this example, a security target may be deemed to have a value of "4" based upon a combination of attributes values representing loads, needs, or demands on security controls and containment features as follows: threat monitoring: 4 (medium demand); threat detection: 4 (medium demand); threat analytics: 4 (medium demand); threat response: 4 (medium demand); storage confidentiality: 4 (medium); storage integrity: 9 (high); network confidentiality: 5 (medium); network integrity: 2 (low); memory confidentiality: 4 (medium); memory integrity: 8 (high); display confidentiality: 7 (medium/high-worried about "shoulder surfers" reading data from an adjacent seat or table nearby, public location) display integrity: 2 (low); user authentication: 4 (medium, two-factor authentication using a hardware token, session expiration upon sleep, screen lock, or logout); IT administration scope: 3 (administrator can monitor, manage, and remediate remotely if the user calls them for help with IT issues); and regulatory compliance: 1 (no GDPR, No HIPAA, no PCI, no tech export restriction, etc.).

Based upon the productivity target and/or context information, a productivity target for the workspace definition may be deemed to have a value of 7 (defining a high-quality, responsive user experience) based upon a combination of attribute values representing productivity requirements as follows: local storage: 7 (partial hard drive control, some storage reserved for IT load); CPU access: 10 (unlimited); local graphics: 10 (unlimited); and application stack: 7 (can use applications, can install some IT-approved applications that the user needs, but no administrator rights, because the user cannot be trusted to install only valid/safe productivity software, but can install pre-approved IT applications as needed).

Third, after the workspace definition is complete, the workspace orchestration service and the local management agent may assemble the workspace and instantiate it for the user. For example, the local management agent may receive definition files (e.g., JSON, XML, etc.) from the orchestration service, and it may parse the file to implement security risk controls such as: threat monitoring: 5 (local management agent installs or confirms prior installation/configuration of TDR software); threat detection: 5 (local management agent installs or confirms prior installation/configuration of TDR software); threat analytics: 5 (orchestration confirms telemetry is accessible, OS will be enrolled in logging if not already enrolled); threat response: 2 (local management agent downloads but does not run remote incident response application-preparation in case incident is detected); storage confidentiality: 5 (local management agent deploys a local container technology, such as sandbox, with restricted "save" permissions such that the confidential files will not be allowed to save locally on the PC, but can be accessed as long as the session is active in memory); storage integrity: 5; network confidentiality: 5 (local management agent steps up firewall protections, disabling all unnecessary ports, and establishes a VPN back to the corporate office for protecting traffic to the local sandbox); network integrity: 5; memory confidentiality: 5 (local management agent configures sandbox container to isolate application and data from other applications/threats that may infiltrate the host OS); memory integrity: 5; display confidentiality: 7 (local management agent confirms graphics drivers installed, enforces privacy screen and uses camera to detect specific onlooker threats); display integrity: 7; user authentication: 4 (local agent confirms basic GPO password rules are configured, and met by user—e.g., number of characters, no session expiration, etc., but also adds in a requirement for hardware token to log in and again to establish network); IT administrator scope: 4 (local agent runs with administrator and remote access privilege, confirms IT admin accounts are listed in local admin user group—e.g., per GPO); and regulatory compliance: 4 (local agent installs state specific rule enforcement or monitoring software).

After confirming the configuration, the workspace orchestration service and the local management agent may give the user access to the requested local confidential file, and the user may begin working in a newly created workspace.

Use-Case C

In use-case C, a user may request access to a confidential datafile in a web hosted remote portal using a browser from Kazakhstan, while at an internet café with a borrowed/rented PC, such configured as described with regard to IHS 100 of FIG. 1 and client IHS 100 of FIG. 3B, on an open Wi-Fi network.

First, a remote workspace orchestration service 332 intercepts the access request and evaluates the browser and user context, and calculates security and productivity scores. In this use-case, there is no local management agent; all that is known is the browser and any telemetry returned or garnered through the HTTP/S session. Assume, for sake of this example, that the confidential data may kept on a shared IT-managed network resource on-premises (e.g., back in a main corporate office) and that the datafile will remain there with only remote rendering/access privileges. Web-based context may be gathered through the browser session or supplied by the user. Moreover, user context may also be collected for the workspace orchestration service through alternate side-channels (e.g., travel calendar information, recent user billing activity on corporate credit card, phone call logs, and/or location data).

When the user selects the desired confidential datafile from the web browser, the back-end web server infrastructure calls back to the workspace orchestration service to request a workspace definition.

In this example, the workspace orchestration service may score an overall security risk to have a value of 9, using a weighed, machine learning, or artificial intelligence algorithm, based upon the following context information or inputs, each of which is also scored as a risk metric based upon a selected policy: locale (e.g., a risk score of 9 for operation of the IHS in Kazakhstan); user persona: 1 (user was expected to be there, the timing seems right based upon past logins, and he has a biometric watch communicator proving he is alive, himself, and located where he says he is-so that IT can always trust him); network risk: 9 (high, public and in a very obscure place); device risk: 9 (zero trust); and regulatory: 8 (based on user, data, location combinations).

The workspace orchestration service may also calculate a productivity score to have a value of 5, using a weighed, machine learning, or artificial intelligence algorithm, based upon the following context information or inputs, each of which is also given as a resource metric based upon a selected policy: locale: 3 (internet café device without great performance); user persona: 9 (known high-confidence and "skilled" classification-advanced compute tasks, proficiency, and speed); network speed/latency: 3 (low quality-Wireless G from a long way away); and device performance: 3 (have to be able to tolerably browse web pages but based on what the service believes the capabilities will be, the service should build simple ones).

Second, based upon the security score and/or context information, the workspace orchestration service builds a workspace definition file having any suitable structure with workspace definition attributes in a machine-readable format (e.g., JSON name-value, XML structured, etc.). In this example, a security target may be deemed to have a value of "9" based upon a combination of attributes values representing loads, needs, or demands on security controls and containment features as follows: threat monitoring: 10 (high demand, to be handled on the server side); threat detection: 10 (high demand, to be handled on the server side); threat analytics: 10 (high demand, to be handled on the server side); threat response: 10 (high demand, to be handled on the server side); storage confidentiality: 10 (high demand, to be handled on the server side); storage integrity: 8; network confidentiality: 10 (high demand, to be handled on the server side); network integrity: 9; memory confidentiality: 10 (high demand, to be handled on the server side); memory integrity: 9; display confidentiality: 10 (high, "shoulder surfers" may read datafile from an adjacent seat or table nearby in a public location); display integrity: 9; user authentication: 10 (high, three-factor authentication using login, hardware token, and biometric satellite watch-session expiration and refreshes every 30 seconds); IT administrator scope: 8 (administrator may monitor, manage, and remediate remotely if the user calls them for help or anything unexpected happens); and regulatory compliance: 10 (all network traffic is securely monitored as will the data presented).

Based upon the productivity target and/or context information, a productivity target for the workspace definition may be deemed to have a value of "3" (defining a usable secure user experience primarily built for consumption and not productivity) based upon a combination of attribute values representing productivity requirements as follows: local storage: 1 (cache only); CPU access: 3 (build for limited expectations); local graphics: 3 (build for limited expectations); and application stack: 1 (web browser experience on a kiosk mode device, limited data entry capability, limited read access to need-to-know only information through VDI rendered kiosk).

Third, after the workspace definition is complete, the workspace orchestration service and remote cloud web portal (e.g., session the user logged into through the browser) may assemble the workspace and instantiate it for the user in the browser. For example, the web portal may receive definition files (e.g., JSON, XML, etc.) from the orchestration service, and it may parse the file to implement security risk controls such as: threat monitoring: 9 (data center based management agent installs or confirms prior installation/configuration of TDR software); threat detection: 9 (data center based management agent installs or confirms prior installation/configuration of TDR software); threat analytics: 9 (orchestration confirms telemetry is accessible, server hosting web server may be enrolled in logging if not already enrolled-user behavioral telemetry from side channels may also be continuously monitored for suspicious/anomalous activity); threat response: 10 (data center-based management agent sets up watchdog timer to kill session automatically without periodic check-ins from orchestration, user telemetry, and web browser); storage confidentiality: 9 (data center-based management agent builds a progressive web application that may be used to display the data through a secure TLS link—the data will be rendered but only the as-needed portions of visualization presented to the user, and nothing can be saved); storage integrity: 10; network confidentiality: 9 (route traffic through best effort to secure locations-do not allow anything except bitmap renderings through the enforceable network); network integrity: 4; memory confidentiality: 9 (web page viewer only—no data leaves the data center, no confidential input is taken from the rented PC, no keyboard input is allowed, and all input may be captured from randomized virtual keyboard using mouse click coordinates); memory integrity: 8; display confidentiality: 8 (best effort to ensure confidentiality—prompt user at least—adjustable font sizes, but defaults to small fonts, obfuscated text, etc.); display integrity: 2; user authentication: 9 (local agent confirms basic password rules are configured, and met by user—e.g., number of characters, no session expiration, etc., but also adds in a requirement for hardware token and biometric, satellite watch to log in and again to establish network, requiring frequent reconfirmation from user); IT administrator scope: 7 (data center-based remote environment); and regulatory compliance: 8 (local agent does not exist but data center-based agent monitors/blocks data not appropriate). After confirming the configuration, the workspace orchestration service and the local management agent may give the user access to the requested rendered data, and the user may begin working in a newly created workspace.

Figure 4:
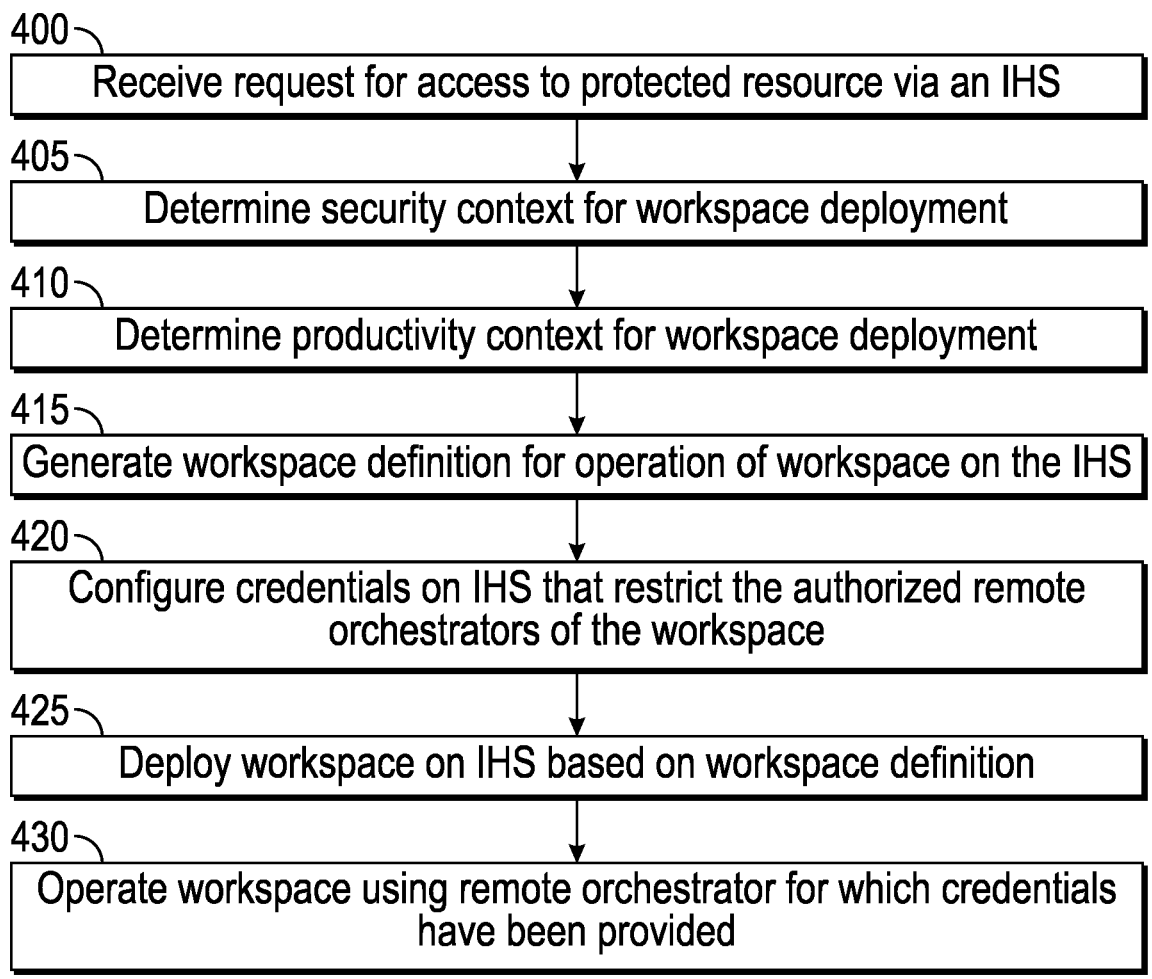
FIG. 4 is a flowchart diagram depicting certain steps of a method according to embodiments for transferring control of remote orchestration of a workspace operating on an IHS.

FIG. 4 is a flowchart diagram depicting certain steps of a method for transferring control of remote orchestration of a workspace operating on the IHS. Some embodiments may begin, at 400, with a user of an IHS that has been configured according to the embodiments described herein requesting access to a protected resource, where access to the protected resource will be provided to the user via a workspace that is hosted, at least in part, using the hardware and software resources the IHS. As described above, embodiments may support a launch point by which a user may initiate workspaces for accessing certain protected resources. Upon a user of an IHS initiating such request, a remote workspace orchestration service may be notified of the request and may respond by determining context information for the request.

Accordingly, at 405, the security context for the requested workspace deployment may be determined. As described above, a local management agent of the IHS may collect various types of information describing a security context for a workspace deployment on an IHS. For instance, the local management agent may collect information describing the user, the authentication status of the user, the security profile for the user, the geographic location of the IHS, whether other individuals are detected in proximity to the IHS, the network in use by the IHS, the operating system of the IHS, authentication capabilities supported by the IHS, antivirus software in use by the IHS, whether the software in use by the IHS has been validated as authentic, etc. As described, these various types of security context information may then be used to calculate a security score for the workspace deployment. In a similar manner, at 410, the productivity context for the workspace deployment may also be determined. As described above, the productivity context may include various productivity characteristics for a workspace deployment on an IHS, such as performance specifications of the IHS, capabilities of the networks in use of the IHS, peripheral devices of the IHS that are available for use, productivity tools (e.g., speech recognition software) supported by the IHS, etc. As with the collected security context information, the productivity context may be used to generate a productivity score for the workspace deployment.

As described above, based on the security score and the productivity score for the workspace deployment, at 415, a workspace definition may be generated by the remote workspace orchestration service, where the workspace definition may specify various types of information used to deploy and operate the workspace on the IHS. For instance, the workspace definition may specify a computing architecture for use in the operation of the workspace. For example, where a request is associated with elevated security score due to the request seeking access to highly protected data using an IHS that has recognized security vulnerabilities, the generated workspace definition may specify a computing architecture in which the workspace itself operates on a cloud resource, with only an image of the workspace output being displayed in a graphical user interface of the IHS. In another example where the request is associated with a lower security score due to fewer identified security vulnerabilities of the IHS, the workspace definition may specify a computing architecture in which the workspace operates as a virtual machine that is independent from the operating system of the IHS. In another example where the request is associated with a still lower security score due to the request seeking access to nonprotected data, the workspace definition may specify a computing architecture in which the workspace operates as a container supported by a web browser of the IHS.

As described, the context in which a workspace is operating may be re-evaluated on an ongoing basis during the operation of the workspace. Based on changes in context, various adaptations to the workspace may be implemented, such as to increase the security protocols in use by the workspace, or such as to make an additional productivity tool available within the workspace. Also as described above, various functions that are directly and indirectly accessible via a remote orchestration service may be utilized in such ongoing support of a workspace. These functions of the remote orchestration service may also include supporting deployment of the workspace on the IHS. In various embodiments, at 420, the remote orchestration service may delegate control of a workspace to a specific orchestrator of the service that provides ongoing support and maintenance of workspace on behalf of the remote orchestration service. In some embodiments, an orchestrator that is tasked with control of a workspace may be any compatible software service that is being supported by a specific IHS, such as by a specific rack-mounted server. In other embodiments, control of a workspace may be delegated to a specific workspace orchestrator operating on a particular IHS, such as by a specific instance of a workspace management program that operates on a specific rack-mounted server. In other embodiments, control of a workspace may be delegated to an orchestrator that is a specific service of a cloud resource, which may be operated by the remote orchestration service. In some embodiments, such delegation of control of a workspace may be initiated prior to deployment of the workspace. Upon selection of a remote orchestrator, embodiments may distribute credentials to the IHS that may then be used by a trusted asset of the IHS to restrict management of a workspace to the specified remote orchestrator.

As described in additional detail below, embodiments may include an arbiter function of the remote orchestration service that interfaces with a trusted resource of the IHS in order to configure policies allowing the workspace to be deployed and/or managed by a specific orchestrator of the remote orchestration service. In some embodiments, the remote orchestrator that is selected by the arbiter may be granted control of the workspace such that the remote orchestrator deploys the workspace and then assumes control of the ongoing management of the workspace, such as the ongoing reevaluation of the suitability of the workspace to changing operating contexts. In other embodiments, the arbiter may transfer control of a workspace to a remote orchestrator once the workspace has been deployed and is operational. In some embodiments, the remote orchestrator that has been selected for management of a workspace and/or the policy that specifies the authorized remote orchestrators may be specified in the workspace definition for that workspace.

As indicated in FIG. 4, at 425, the workspace is deployed on the IHS based on the workspace definition, in some cases by a remote orchestrator that is specified in the workspace definition and that has been authorized for management of the workspace with a trusted resource of the IHS, such as via procedures described in additional detail below. As described, the workspace definition may also specify a computing architecture for operation of the workspace, where the computing architecture for the workspace may utilize hardware and software resources of the IHS to varying degrees. With the workspace deployed in this manner, at 430, the user may operate the workspace through ongoing support provided by the remote orchestrator specified in the workspace definition. As described in additional detail below, credentials that authorize the remote orchestrator's management of the workspace may be maintained by a trusted resource of the IHS and consulted in order to authenticate information and commands received from the remote orchestrator in administration of the workspace.

Figure 5:
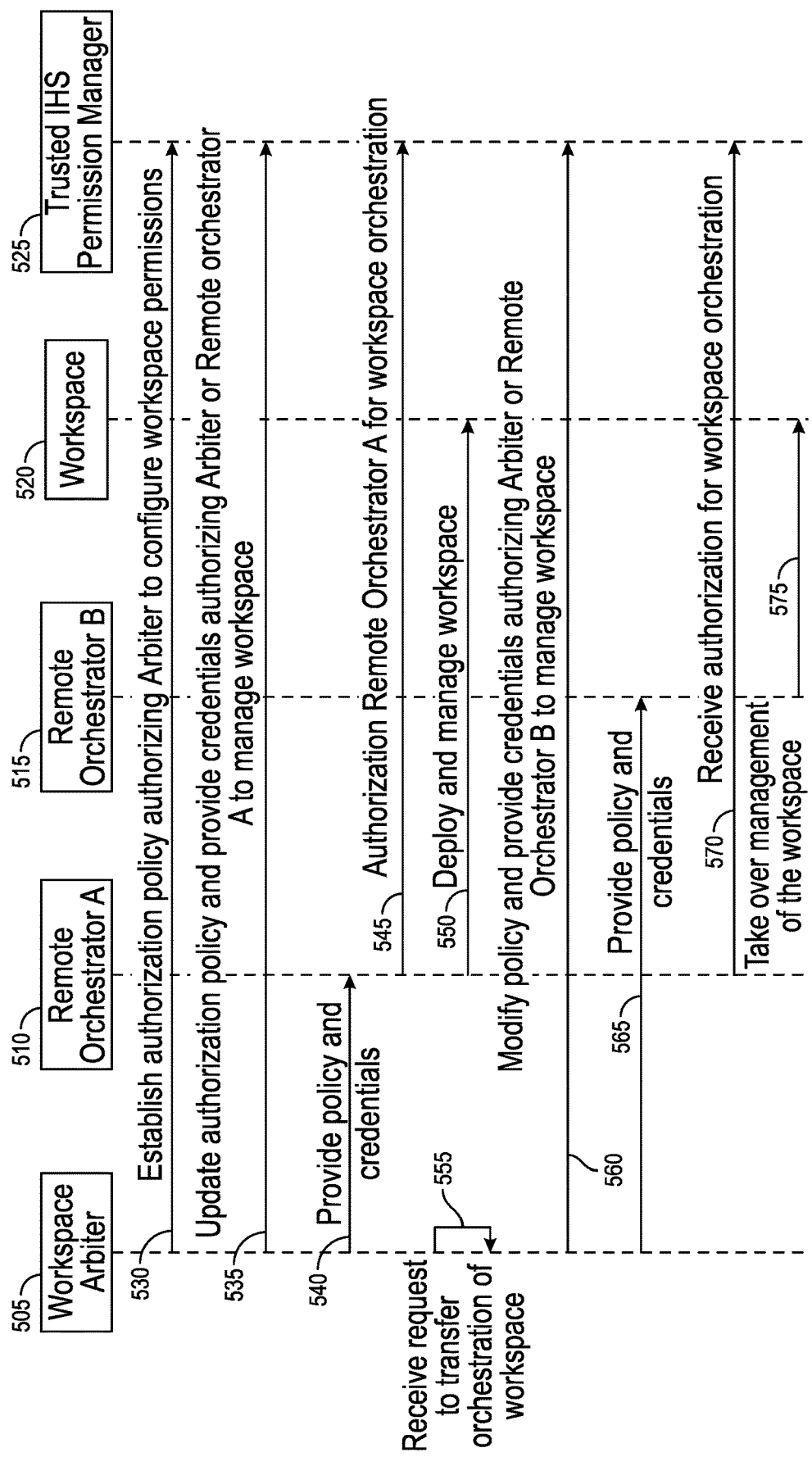
FIG. 5 is a swim lane diagram depicting operations by certain components of a system configured according to embodiments to transfer control of remote orchestration of a workspace operating on an IHS.

FIG. 5 is a swim lane diagram depicting operations by certain components of a system configured according to embodiments to transfer control of remote orchestration of a workspace operating on an IHS. As described above, a workspace orchestration service may be comprised of a variety of computing functions used in the configuration, deployment and operation of workspaces on IHSs that are configured according to embodiments described herein. In some embodiments, a workspace orchestration service may include a workspace arbiter 505 that assigns specific orchestration components of the remote orchestrators orchestration service as being authorized to manage a specific workspace. Accordingly, a workspace arbiter 505 may assign a remote orchestrator for administration of a workspace prior to actual deployment of the workspace. In such instances, the assigned remote orchestrator may thus be tasked with deployment and ongoing management of the workspace. In some embodiments, the workspace arbiter 505 may select a particular remote orchestrator for management of a particular workspace based on the security and productivity contexts for that workspace. For instance, in response to a heightened security context may result in the selection of a workspace orchestrator that supports certain security protocols, such as biometric authentication of individual users of an IHS.

Embodiments may begin, at 530, with the workspace arbiter establishing an authorization policy on the IHS that authorizes the arbiter 505 to manage entities that are authorized to perform management operations on a workspace that is to be deployed on the IHS. As illustrated, the arbiter 505 may interface with a trusted permission manager 525 of the IHS in configuring permissions related to the orchestration of a workspace 520 that will operate on the IHS. In some embodiments, the trusted permission manager 525 may be a TPM (trusted platform module) of the IHS, such as described with regard to FIG. 1, that supports various cryptographic functions and management of security credentials on behalf of the IHS. In other embodiments, the trusted permission manager 525 may be a trusted controller of the IHS, also as described with regard to FIG. 1, that is similarly configured to manage security credentials on behalf of the IHS, or at least with respect to workspace operations on the IHS.

In embodiments where the trusted platform manager 525 is a TPM of the IHS, the policy configurations may include an authorization policy that is defined through software interfaces supported by the TPM. In such embodiments, the arbiter 505 may interface with a local management agent operating on the IHS, a trusted controller of the IHS and/or directly with the TPM of the IHS in order to configure an authorization policy that is to be managed by the IHS. In providing management of the authorization policy, the TPM may provide security functions that determine whether an entity presenting credentials is an entity that is authorized to perform actions specified by the authorization policy. In some instances, based on those credentials and the authorization policy, the TPM may also ascertain a level of permissions associated with the presenter of the credentials. In some embodiments, these authorization policy capabilities of an IHS may be provided instead by a trusted controller of the IHS, such as described with regard to FIG. 1.

In configuring an authorization policy with a trusted permission manager 525, such as a TPM of the IHS, the authorization policy serves to define the authorized orchestrators of a workspace 520, where the workspace 520 may already be operating on the IHS, or where the workspace 520 is yet to actually be deployed on the IHS. In some embodiments, the authorization policy defined through the operations of the arbiter 505 such that only the arbiter 505 may modify the entities that are authorized to perform actions specified by the authorization policy. In implementing an authorization policy that has been configured in this manner, the trusted permission manager 525 thus rejects any received inputs that attempt to alter the members of the authorization policy, other than authorization policy modifications received from arbiter 505. Accordingly, when configuring an authorization policy in this manner, at 530, the arbiter 505 may present the trusted permission manager with credentials that can be used to authenticate the identity of the arbiter as the entity requesting a modification to the authorization policy, and thus to the authorized orchestrators of workspace 520.

With the authorization policy established, at 535, the arbiter 505 configures the policy such that arbiter 505 and an initial workspace orchestrator 510 are authorized to perform management tasks for workspace 520. In some embodiments, the arbiter 505 provides the trusted permission manager with credentials, such as encrypted passcodes or identity certificates, that can be used to identify and authenticate communications from each of these authorized orchestrators. In embodiments where the trusted permission manager 525 is a TPM, these provided credentials that identify the members of the authorization policy for workspace 520 may be securely stored and managed through credential management capabilities of the TPM. With the authorization policy configured on the IHS, at 540, the arbiter 505 may proceed to provide management credentials to the initial workspace orchestrator 510. The arbiter 505 may also notify the initial workspace orchestrator 510 of certain details of the management policy for workspace 520, such as specific management task that the initial workspace orchestrator 510 is authorized to perform.

Using these credentials provided by the arbiter, at 545, the initial workspace orchestrator 510 receives authorization from the trusted permission manager 525 of the IHS to perform management tasks for workspace 520. Once authorized, at 550, the initial workspace orchestrator 510 deploys the workspace 520 on the IHS and, once it is operational, begins ongoing management of the workspace. As described, remote orchestration of a workspace may include ongoing evaluation of the security and productivity contexts in which the workspace is operating. In response to detected context changes during the operation of workspace 520, the initial workspace orchestrator 510 may direct commands to the workspace 520 and/or the local management agent operating on the IHS in order to make modifications to the computing architecture employed by the workspace 520 and/or the software available via the workspace.

In some instances, the initial workspace orchestrator 510 may serve as the sole orchestrator throughout the lifespan of the workspace 520. However, in other instances, orchestration of workspace 520 may be transferred to another orchestrator 515, where the transfer may be for permanent or for temporary administration of the workspace. For example, permanent transfer of orchestration of workspace 520 may be required due to the initial workspace orchestrator 510 being removed from service, such as due to upgrades or other maintenance of the server hardware on which the initial workspace orchestrator operates. In other instances, permanent transfer of orchestration a workspace 520 may be initiated in order to provide the workspace with expanded capabilities that are supported by a different workspace orchestrator 515. In other instances, permanent transfer of orchestration of workspace 520 may be initiated in order to load balance the management of workspaces by the various orchestrators that may operate as part of the described workspace orchestration service.

In some instances, orchestration of workspace 520 may be temporarily transferred to another orchestrator 515, such as to support specific workspace maintenance and/or upgrades that are supported by this particular orchestrator 515. As indicated in FIG. 5, at 555, the arbiter 550 may receive notice of such transfers of control of orchestration for workspace 520. In some instances, a notification of a transfer may be received by the arbiter 505 from the initial workspace orchestrator 510, such as in response to the initial workspace orchestrator 510 being removed from service, or such as a notification of a temporary transfer in order for maintenance or other procedures to be performed on the workspace 505. In other instances, such a notification may be received from another component of the workspace orchestration service. For example, upgrades to security protocols throughout the system of workspaces supported by the workspace orchestration service may require upgrades to some or all of the workspaces supported by the workspace orchestration service. In some cases, certain security upgrades may only be made by certain components of the remote orchestration service, such as certain orchestrators that have access to highly protected cryptographic information. In other cases, certain maintenance procedures, such as software upgrades and installation of protected software, may be generally handled by specialized remote orchestrators.

In scenarios where control of orchestration for workspace 520 is to be transferred, the orchestration arbiter 505 may be provided notification of the next remote orchestrator 515 to which control will be transferred. In other scenarios, the arbiter 505 may select the next remote orchestrator 515, where the next remote orchestrator 515 may be selected based on its suitability for assuming permanent control of workspace 520, or may be selected based on its capabilities and providing specific maintenance and/or upgrade operations for workspaces. At 560, the arbiter 505 may interface with the trusted permission manager 525 of the IHS in order to modify the authorization policy that was previously configured to restrict maintenance of workspace 520 to the arbiter 505 and the initial workspace orchestrator 510.

Figure 6:
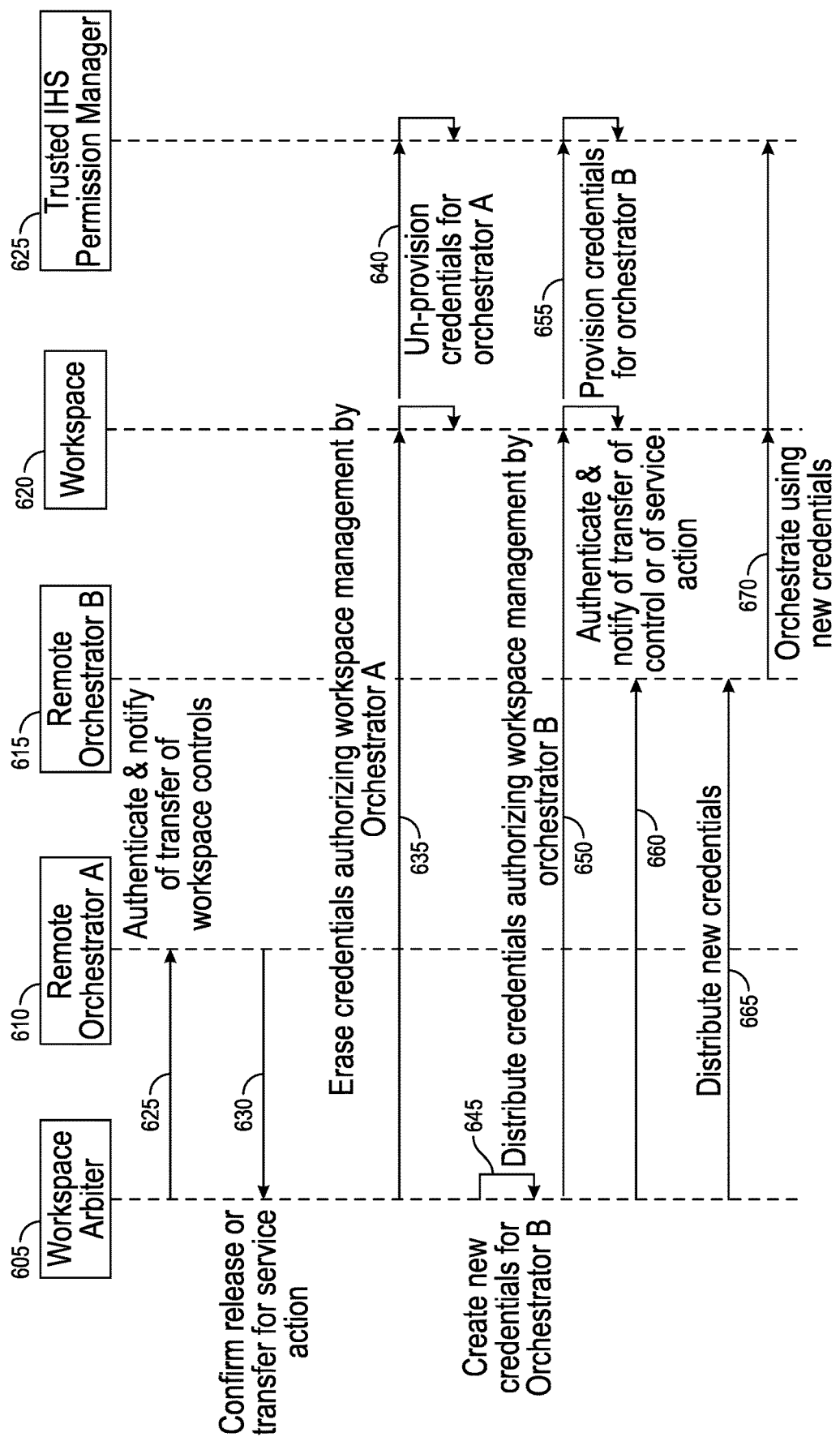
FIG. 6 is a swim lane diagram depicting additional operations by certain components of a system configured according to embodiments to transfer control of remote orchestration of a workspace operating on an IHS.

As described in additional detail with regard to FIG. 6, in such instances, at 560, the arbiter 505 modifies the authorization policy such that the permissions for managing workspace 520 by the initial workspace orchestrator 510 are revoked and replaced with permissions allowing administration of workspace 520 by another workspace orchestrator 515. As indicated in FIG. 5, in making this transfer, the arbiter 505 provides the trusted permission manager 525 with credentials that authorize management of workspace 520 by the subsequent workspace orchestrator 515. As before, these credentials may then be used to validate whether commands received from the subsequent workspace orchestrator 515 are authentic and to determine the administrative actions on workspace 520 that may be performed by the subsequent workspace orchestrator 515. In embodiments where the trusted permission manager 525 is a TPM of the IHS, the TPM allows this modification of the authorization policy based on validation of credentials presented by the arbiter 505 which validate the arbiter as an entity that is authorized to modify the policy for workspace 520.

With the authorization policy modified, at 565, the arbiter 505 distributes the credentials authorizing management of workspace 520 to the subsequent workspace orchestrator 515. At 570, the subsequent workspace orchestrator 515 uses these credentials to receive authorization from the trusted permission manager 525 of the IHS to perform management tasks for workspace 520. Based on these credentials presented by the subsequent workspace orchestrator 515, the trusted permission manager 525 validates that the subsequent workspace orchestrator 515 is a member of the authorization policy specifying the authorized administrators of workspace 520. Now authorized, at 575, the subsequent workspace orchestrator 515 assumes control of management of workspace 520. As described, in some instances, such a transfer of control may be for the purpose of the subsequent workspace orchestrator 515 assuming full control of management of workspace 520 on a permanent basis. However, in other instances, the transfer of control may be temporary, such as to allow the subsequent workspace orchestrator 515 to perform specific management operations on workspace 520. In such instances, upon completion of these specific management operations by the subsequent workspace orchestrator 515, the subsequent workspace orchestrator 515 may notify the arbiter 505 of the completed management operations such that the operations of FIG. 5 return to 555, with the notification serving as a signal that control of workspace 520 can be returned back to the original workspace orchestrator 510, or to another orchestrator that will assume full-time control of workspace 520.

FIG. 6 is a swim lane diagram depicting additional operations by certain components of a system configured according to embodiments to transfer control of remote orchestration of a workspace operating on an IHS. As described, an arbiter 605 that controls the assignment of authorized orchestrators of a workspace 620 may receive notifications of a full-time or temporary transfer of control of orchestration of the workspace 620. Upon receiving such a notification of a transfer of control of workspace 620 from a first remote orchestrator 610 to a second remote orchestrator 615, at 625, the arbiter 605 authenticates the first remote orchestrator 610 and provides notification of the transfer. In some instances, the notification provided to the first remote orchestrator 610 is an acknowledgment to a transfer request that was issued by first remote orchestrator 610. In other instances, the notification provided to the first remote orchestrator 610 is a notification of a transfer that has been requested by another entity, such as a workspace management agent of the workspace orchestration service, where this agent provides specific management operations, such as security upgrades, for workspaces. At 630, the first remote orchestrator 610 provides the arbiter 605 with a confirmation or other acknowledgment of the transfer of control of workspace 620, and whether the transfer is for full-time control of workspace 620 or is a transfer of control for a specific service action on workspace 620.

Embodiments may continue, at 635, with the arbiter 605 directing the erasing of the credentials authorizing control of workspace 620 by the first remote orchestrator 610. As indicated in FIG. 6, the directive from the arbiter 605 to revoke management credentials of first remote orchestrator 610 may be received by workspace 640 and/or trusted permission manager 625 of the IHS. In some embodiments, the orchestrator that has been authorized for management of workspace 620 may be specified within the workspace definition of workspace 620. In such embodiments, at 640, the revocation of the first remote orchestrator 610 may result in the first remote orchestrator 610 being erased from the workspace definition of workspace 620. Also as part of the deprovisioning of the first remote orchestrator 610, the trusted permission manager 625 modifies the authorization policy for management of workspace 620. In embodiments where the trusted permission manager 625 is a TPM of the IHS, the TPM validates credentials presented by the arbiter 605 before modifying the authorization policy. As described, the arbiter 605 may establish the authorization policy with permissions that permit only the arbiter 605 to add and remove members from the authorization policy.

At 645, the arbiter 605 creates a new set of credentials for use by a second remote orchestrator 615 in the management of workspace 620. As described, the workspace orchestration service of which the arbiter 605 is a component may include a certificate authority capable of generating cryptographic credentials, such as unique passwords and identity certificates. Using such capabilities, the arbiter 605 generates credentials that can be used to authenticate communications from the second remote orchestrator 615. At 650, the arbiter 605 distributes these new credentials of the second workspace orchestrator 615 to the workspace 620 and/or to the trusted permission manager 625. At 655, the workspace definition of workspace 620 may be modified to reflect that the second workspace orchestrator 615 is an authorized orchestrator for workspace 620. In addition, based on credentials presented by arbiter 605 that allow modification of the authorization policy of workspace 620, the trusted permission manager 625 adds the second workspace orchestrator 615 to the authorization policy. In some embodiments, the authorization policy may also be updated to reflect the specific permissions that are being granted to the second workspace orchestrator 615. For instance, the authorization policy may reflect that the second workspace orchestrator 615 has full administrative control over workspace 620, or may reflect that the second workspace orchestrator 615 has limited administrative control that permits specific management tasks with regard to workspace 620, such as specific software updates to workspace 620.

With the authorization policy for workspace 620 now updated, at 660, the arbiter 605 authenticates the second remote orchestrator 615 and provides notification of the transfer of control of orchestration for workspace 620, where the notification may indicate a transfer of full-time control of workspace 620 or of a temporary transfer of control for a specific service action on workspace 620. If the second remote orchestrator 615 is properly authenticated and confirms transfer, at 665, the arbiter 605 distributes the generated credentials to the second remote orchestrator 615. Using these credentials, at 670, the second remote orchestrator 615 may interface with the trusted permission manager 625 in receiving authorization for management of workspace 620 and in performing various management operations on workspace 620.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A method for transferring control of workspaces on an Information Handling System (IHS), the method comprising:
    establishing, on the IHS, an authorization policy that is only modifiable based on information provided by an arbiter of a remote workspace orchestration service, wherein the authorization policy specifies authorized administrators of a workspace operating on the IHS;
    modifying the authorization policy to specify the arbiter and a first remote orchestrator service of the remote workspace orchestration service as authorized administrators of the workspace;
    allowing administration of the workspace by the first remote orchestrator service based on credentials provided by the first remote orchestrator service that validate it as one of the authorized administrators specified by the authorization policy;
    receiving notification of a transfer of orchestration of the workspace to a second remote orchestrator service of the remote workspace orchestration service;
    modifying the authorization policy to specify the arbiter and the second remote orchestrator service as authorized administrators of the workspace; and
    allowing administration of the workspace by the second remote orchestrator service based on credentials provided by the second remote orchestrator service that validate it as one of the authorized administrators specified by the authorization policy.

2. The method of claim 1, wherein the authorization policy is implemented by a TPM (Trusted Platform Module) of the IHS.

3. The method of claim 2, wherein the TPM validates the credentials provided by the first remote orchestrator service and the credentials provided by the second remote orchestrator service.

4. The method of claim 3, wherein the modification of the authorization policy that specifies the first remote orchestrator service as an authorized administrator provides authorization policy credentials for validating the first remote orchestrator service, and wherein the modification of the authorization policy that specifies the second remote orchestrator service as an authorized administrator provides authorization policy credentials for validating the second remote orchestrator service.

5. The method of claim 4, wherein the credentials provided by the first remote orchestrator service and the credentials provided by the second remote orchestrator service are validated by the TPM against the authorization policy credentials provided by the arbiter.

6. The method of claim 1, further comprising: modifying, by the arbiter, the authorization policy to remove second remote orchestrator service as an authorized administrator of the workspace.

7. The method of claim 1, wherein the workspace is deployed on the IHS based on a workspace definition that specifies the first remote orchestrator service as an authorized administrator of the workspace.

8. The method of claim 7, wherein the modification of the authorization policy to specify the arbiter and the second remote orchestrator service as authorized administrators of the workspace further comprises modification of the workspace definition to remove the first remote orchestrator service and to add the second remote orchestrator service as authorized administrators of the workspace.

9. The method of claim 1, wherein the transfer of orchestration of the workspace to the second remote orchestrator service comprises a temporary transfer allowing the second remote orchestrator service to perform a plurality of service actions on the workspace.

10. The method of claim 9, further comprising, once the service by the second remote orchestrator service is complete, modifying the authorization policy to specify the arbiter and the first remote orchestrator service as authorized administrators of the workspace.

11. An Information Handling System (IHS), the IHS comprising:
    a processor;
    a memory coupled to the processor, the memory having program instructions stored thereon that, upon execution, cause the processor to operate a workspace on the IHS; and
    a TPM (Trusted Platform Module) having program instructions stored thereon that, upon execution, cause the TPM to:
        establish an authorization policy that is only modifiable based on information provided by an arbiter of a remote workspace orchestration service, wherein the authorization policy specifies authorized administrators of the workspace;
        modify the authorization policy to specify the arbiter and a first remote orchestrator service of the remote workspace orchestration n service as authorized administrators of the workspace;
        allow administration of the workspace by the first remote orchestrator service based on credentials provided by the first remote orchestrator service that validate it as one of the authorized administrators specified by the authorization policy;
        receive notification of a transfer of orchestration of the workspace to a second remote orchestrator service of the remote workspace orchestration service;
        modify the authorization policy to specify the arbiter and the second remote orchestrator service as authorized administrators of the workspace; and
        allow administration of the workspace by the second remote orchestrator service based on credentials provided by the second remote orchestrator service that validate it as one of the authorized administrators specified by the authorization policy.

12. The IHS of claim 11, wherein the TPM validates the credentials provided by the first remote orchestrator service and the credentials provided by the second remote orchestrator service.

13. The IHS of claim 11, wherein the workspace is deployed on the IHS based on a workspace definition that specifies the first remote orchestrator service as an authorized administrator of the workspace.

14. The IHS of claim 12, wherein the modification of the authorization policy to specify the arbiter and the second remote orchestrator service as authorized administrators of the workspace further comprises modification of the workspace definition to remove the first remote orchestrator service and to add the second remote orchestrator service as authorized administrators of the workspace.

15. The IHS of claim 11, wherein the transfer of orchestration of the workspace to the second remote orchestrator service comprises a temporary transfer allowing the second remote orchestrator service to perform a plurality of service actions on the workspace.

16. The IHS of claim 15, wherein once the service by the second remote orchestrator service is complete, the authorization policy is modified to specify the arbiter and the first remote orchestrator service as authorized administrators of the workspace.

17. A system comprising:
an IHS (Information Handling System) comprising:
a processor; and
a memory coupled to the processor, the memory having program instructions stored thereon that, upon execution, cause the processor to operate a workspace on the IHS;
a workspace orchestration service that supports workspaces operating on the IHS (Information Handling System), wherein the workspace orchestration service comprises:
a first remote orchestrator service;
a second remote orchestrator service; and
an arbiter configured to:
establish an authorization policy on the IHS that is only modifiable based on information provided by the arbiter, wherein the authorization policy specifies authorized administrators of the workspace;
modify the authorization policy to specify the arbiter and the first remote orchestrator service as authorized administrators of the workspace, wherein based on the modification of the authorization policy, administration of the workspace by the first remote orchestrator service is allowed, wherein the first remote orchestrator service provides credentials that validate it as one of the authorized administrators specified by the authorization policy;
receive notification of a transfer of orchestration of the workspace to a second remote orchestrator service; and
modify the authorization policy to specify the arbiter and the second remote orchestrator service as authorized administrators of the workspace, wherein based on the modification of the authorization policy, administration of the workspace by the second remote orchestrator service is allowed, wherein the second remote orchestrator service provides credentials that validate it as one of the authorized administrators specified by the authorization policy.

18. The system of claim 17, wherein the authorization policy is implemented by a TPM (Trusted Platform Module) of the IHS.

19. The system of claim 18, wherein the TPM validates the credentials provided by the first remote orchestrator service and the credentials provided by the second remote orchestrator service.

20. The system of claim 19, wherein the modification of the authorization policy that specifies the first remote orchestrator service as an authorized administrator provides authorization policy credentials for validating the first remote orchestrator service, and wherein the modification of the authorization policy that specifies the second remote orchestrator service as an authorized administrator provides authorization policy credentials for validating the second remote orchestrator service.

* * * * *

UNITED STATES PATENT AND TRADEMARK OFFICE
CERTIFICATE OF CORRECTION

PATENT NO. : 12,223,029 B2
APPLICATION NO. : 17/647796
DATED : February 11, 2025
INVENTOR(S) : Nicholas D. Grobelny and Charles D. Robison Page 1 of 1

It is certified that error appears in the above-identified patent and that said Letters Patent is hereby corrected as shown below:

In the Claims

In Column 36, Line 37, Claim 11, delete "workspace orchestration n service as authorized" and insert -- workspace orchestration service as authorized -- therefor.

Signed and Sealed this
Eleventh Day of March, 2025

Coke Morgan Stewart
*Acting Director of the United States Patent and Trademark Office*